US010530877B2

(12) United States Patent
Maccini et al.

(10) Patent No.: US 10,530,877 B2
(45) Date of Patent: *Jan. 7, 2020

(54) METHOD AND SYSTEM FOR CROSS CHANNEL IN-CAR MEDIA CONSUMPTION MEASUREMENT AND ANALYSIS USING BLOCKCHAIN

(71) Applicant: Drive Time Metrics, Inc., Jamestown, RI (US)

(72) Inventors: Robert J. Maccini, Jamestown, RI (US); Roderick MacKenzie, Ft. Lauderdale, FL (US); Joseph V. Gallagher, Newport, RI (US); Rafael Saavedra, Sunnyvale, CA (US); Peter Williams, Belmont, CA (US)

(73) Assignee: Drive Time Metrics, Inc., Jamestown, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,858

(22) Filed: Apr. 23, 2019

(65) Prior Publication Data
US 2019/0312941 A1 Oct. 10, 2019

Related U.S. Application Data

(63) Continuation of application No. 16/261,691, filed on Jan. 30, 2019, which is a continuation-in-part of (Continued)

(51) Int. Cl.
*H04L 29/08* (2006.01)
*H04H 60/33* (2008.01)
(Continued)

(52) U.S. Cl.
CPC .......... *H04L 67/22* (2013.01); *G06F 16/2365* (2019.01); *G06F 16/48* (2019.01);
(Continued)

(58) Field of Classification Search
CPC .... G06F 16/2365; G06F 16/48; G06F 21/602; H04H 60/33; H04H 60/88; H04L 9/0637; H04L 9/3242; H04L 67/22; H04W 4/48
See application file for complete search history.

(56) References Cited

U.S. PATENT DOCUMENTS 5,896,554 A 4/1999 Itoh et al.
7,359,687 B2 4/2008 Ceresoli et al.
(Continued)

FOREIGN PATENT DOCUMENTS

CA 2441373 A1 3/2005
CN 203119912 U 8/2013

OTHER PUBLICATIONS

Media Rating Council accredited service providers—http://www.mediaratingcouncil.org/Accredited%20Services.htm.

*Primary Examiner* — Gil H. Lee
(74) *Attorney, Agent, or Firm* — Barlow, Josephs & Holmes, Ltd.

(57) ABSTRACT

A method and system for measuring and analyzing in vehicle media consumption and user interaction with a vehicle through an in vehicle entertainment system located in the vehicle. The in vehicle entertainment system receives media content. The method and system monitors both the media content and user interaction with the vehicle with content and interaction measurement software stored in the storage of the head unit of the vehicle as a module on the in vehicle entertainment system. The content measurement software directly records data relative to the media content being played or user interaction, in real time, as a data set and transmits the data set relative to the media content being played and user interaction to at least one immutable distributed ledger. The data set includes at least the local time of the start of the media content or the user interaction and is hashed.

29 Claims, 15 Drawing Sheets

Related U.S. Application Data application No. 16/180,173, filed on Nov. 5, 2018, which is a continuation-in-part of application No. 14/872,497, filed on Oct. 1, 2015, now Pat. No. 10,165,070.

(60) Provisional application No. 62/059,420, filed on Oct. 3, 2014.

(51) Int. Cl.

| | | |
|---|---|---|
| *H04W 4/48* | (2018.01) | |
| *H04H 60/88* | (2008.01) | |
| *H04L 9/32* | (2006.01) | |
| *G06F 21/60* | (2013.01) | |
| *G06F 16/23* | (2019.01) | |
| *G06F 16/48* | (2019.01) | |
| *H04L 9/06* | (2006.01) | |

(52) U.S. Cl.
CPC ........... *G06F 21/602* (2013.01); *H04H 60/33* (2013.01); *H04H 60/88* (2013.01); *H04L 9/0637* (2013.01); *H04L 9/3242* (2013.01); *H04W 4/48* (2018.02)

(56) References Cited

U.S. PATENT DOCUMENTS

| | | | |
|---|---|---|---|
| 7,486,925 B2 | 2/2009 | Breen | |
| 7,584,484 B2 | 9/2009 | Headley et al. | |
| 8,549,552 B2 | 10/2013 | Ramaswamy et al. | |
| 8,666,303 B2 | 2/2014 | Ramaswamy et al. | |
| 2003/0216120 A1 | 11/2003 | Ceresoli et al. | |
| 2005/0221774 A1* | 10/2005 | Ceresoli | H04H 60/32 |
| | | | 455/152.1 |
| 2005/0258942 A1* | 11/2005 | Manasseh | G07C 5/008 |
| | | | 340/425.5 |
| 2006/0105702 A1 | 5/2006 | Muth et al. | |
| 2006/0206582 A1 | 9/2006 | Finn | |
| 2010/0131642 A1* | 5/2010 | Chalikouras | G06Q 30/02 |
| | | | 709/224 |
| 2010/0257052 A1 | 10/2010 | Zito et al. | |
| 2011/0010435 A1 | 1/2011 | Okaya et al. | |
| 2011/0103595 A1* | 5/2011 | Ramaswamy | H04R 29/00 |
| | | | 381/56 |
| 2012/0265617 A1 | 10/2012 | Reynolds | |
| 2014/0073236 A1 | 3/2014 | Iyer | |
| 2014/0160667 A1* | 6/2014 | Van Velzen | G06F 1/1632 |
| | | | 361/679.41 |

\* cited by examiner

METHOD AND SYSTEM FOR CROSS CHANNEL IN-CAR MEDIA CONSUMPTION MEASUREMENT AND ANALYSIS USING BLOCKCHAIN

CROSS REFERENCE TO RELATED APPLICATION

This application is a continuation-in-part of and claims priority from earlier filed U.S. patent application Ser. No. 16/261,691, filed on Jan. 30, 2019, which is a continuation-in-part of and claims priority from earlier filed U.S. patent application Ser. No. 16/180,173, filed on Nov. 5, 2018, which is a continuation-in-part of earlier filed U.S. patent application Ser. No. 14/872,497, filed Oct. 1, 2015, now U.S. Pat. No. 10,165,070, which claims benefit to U.S. Provisional Patent Application Ser. No. 62/059,420, filed Oct. 3, 2014, the entire contents thereof are each incorporated herein by reference.

BACKGROUND OF THE INVENTION

Research studies in the media industry typically, and consistently, indicate that more than 50% of radio listening is done in a vehicle, such as a car, and further that more than 50% of all audio listening occurs in such a vehicle. However, today there does not exist any ability to actually measure and effectively analyze what people are really listening to, or watching, while in a vehicle—with accurate time and/or location data tied to a distributed ledger.

At the outset, measurement and analysis of media consumption while in a vehicle is important to multiple stakeholders, such as: 1) radio (and other content) advertising businesses to support the buying/selling and pricing of advertising (the US market for radio advertising alone being valued at $17 billion in 2013); 2) radio station owners and programming managers to guide their selection of programming and on-air talent; 3) the music industry to gauge public reaction to artists and their work; 4) the automotive industry to understand the behavior of their customers while in their vehicles; 5) and any other entity that may be interested in the measurement and analysis of such media consumption.

There have been many attempts in the prior art to generate estimates of the use of in-vehicle audio content. For example, Nielsen Audio, previously Arbitron, provides a service to estimate the audience of AM/FM radio stations, which is primarily based on periodic survey methodologies using samples. These include use of log book/diaries, which are manually filled out by a limited sample of selected participants, and the use of specialized devices such as Nielsen's "Portable People Meter" or PPM. A PPM is a small device worn or carried by selected participants which identifies any AM/FM radio stations in earshot of the participant from identification signals embedded in each individual radio station broadcast. Other approaches have involved the use of expensive specialized measurement equipment added to a sample number of vehicles.

However, these existing prior art methods have many disadvantages and problems. As a result, these estimation methodologies are considered to be outdated and inadequate to meet the current needs of stakeholders because they, for example, suffer from: 1) small participant sample size; 2) high cost of gathering data in this manner; 3) potential for the statistical integrity of the approach to be compromised (whether unintentionally or fraudulently) by the participants; 4) infrequent periodic timing (only several times per year) with significant lag time between survey and report availability, thus not providing the potential for real-time monitoring and analysis desired by the industry; 5) lack of ability to comparatively measure "cross channel" audio consumption (e.g. AM/FM radio vs. SDARS vs. Internet Radio, etc.); 6) the lack of ability to measure all types of media consumption (e.g. audio, video, etc.); and at least 7) the lack of the ability to ensure the integrity of the data by immutability tying such data to a distributed ledger schema.

Despite the foregoing limitations in the methodology used, Nielsen still generated more than $450M from the sale of AM/FM radio measurement data for the US market in 2013 as no viable alternative rating source data is available.

Nielsen utilizes panels of selected participants where they ask questions regarding audio usage and then extrapolates to the population. Nielsen also utilizes a PPM (portable people meter) which is a small metering device that is carried by a small group of people which listens to what audio is around them and can identify what stations are playing based on code that is, embedded in a station's broadcast, to measure FM and AM radio. This too is a sample.

As another prior art example, Triton Digital measures Internet radio listening utilizing server logs for each station/channel. Typically, each individual channel has access to this information as well from their content delivery network.

In a further example, SiriusXM is not able to measure what channels its subscribers are listening to as it is primarily a one-way broadcast via satellites, In view of the above, there is currently no comprehensive source of data for the accurate measurement of the full spectrum of media content that is actually consumed in an automobile. The currently available estimates of in-vehicle audio listening are deficient in many ways, including: 1) Not real-time or near real-time (surveys conducted only several times per year with considerable lag time before reports are available); 2) Do not cover all potential media sources (e.g. can estimate AM/FM radio but cannot estimate SDARS, internet radio, stored media, streaming media, etc.); 3) Unable to provide "cross-channel" comparison (e.g. between FM & SDARS); 4) Unable to measure content brought in to the vehicle via a connected MP3 player, DVD/Blu-ray player, smartphone or other Consumer Electronic (CE) device; 5) Survey-based methodology (rather than actual measurement); 6) Small survey participant sample size; 7) Significant vulnerability to bias and fraud; 8) High cost of data collection (both the high cost of administering the survey participants and the high cost of specialized monitoring equipment such as Nielsen's PPM device); 9) Provide minimal geographic location information; 10) Does not include any accurate timing information for correlation with multiple sources; 11) are unable to provide detailed information on which advertising commercials a user heard, how and where they were heard, and whether the user took action as a result of hearing the ad, etc.

The clear industry requirement, not met by any existing system, is for a comprehensive capability that measures all forms of media consumed in the vehicle including, but not limited to, terrestrial AM/FM, HD Radio, SDARS (SIRIUS XM), Internet radio and audio/video streaming services (e.g. PANDORA, TUNEIN, SPOTIFY, RDIO, SONGZA, YOU-TUBE, etc.), personal media collection (CD, MP3, podcast, DVD, Blu-ray, etc.), audio books, podcasts, text-to-speech, use of hands-free calling and other audio, including content routed to the In Vehicle Entertainment (IVE) system through integration with a smartphone, MP3 player or similar external CE device (via wired or wireless connectivity, including but not limited to USB, BLUETOOTH, Wi-Fi, etc. and including various platforms for in-vehicle smartphone integration such as APPLE CARPLAY, GOOGLE ANDROID AUTO, HARMAN AHA RADIO, PANASONIC AUPEO, PIONEER ZYPR, FORD SYNC, MIRRORLINK, AIRBIQUITY CHOREO, etc.).

Another clear requirement, which is not met by any existing system is the need to facilitate low-cost, large-scale deployment to support measurement from a large user sample to ensure a high level of statistical integrity and accuracy. Existing approaches using a) survey-based methodologies or b) methodologies requiring specialized equipment that needs to be installed in a vehicle do not provide the potential to meet this objective in a viable and cost-effective manner.

To meet industry expectation, there is a need for a system to be able to continuously provide measurement data in real-time and with a high degree of geographic location accuracy. A large sample size, as identified above, is also a pre-requisite of achieving this requirement.

Still further, having developed a system and methodology to actually measure the media content, including audio and video, consumed in a vehicle, there is also a demand for a differentiation between multiple users of the vehicle (e.g. members of the same family). This includes contextual analysis of how media consumption may differ with situation (e.g. a mother or father may primarily listen to adult news and music content during their commute while alone in the car but might listen to kids channels whenever their children are in the car).

Further still, the instant system and methodology allows for the measurement of data, audio, and video as well as other content delivered to a vehicle. For example, a vehicle can receive a display ad, coupon, cryptographic token, audio, video or other content relating to a fast food restaurant. Using data associated with what is being broadcast/transmitted to the vehicle as well as location data from the system, the instant method and system can determine whether the vehicle took an action, e.g. drove to the store or accessed a website, saved the information for later, etc. This analysis is also known as ad attribution. Comparing the activity of vehicles that viewed/heard an ad to the vehicles that did not view/hear the ad results in the ability to measure video store ad conversion rates, number of store visits, advertising lift and ad cost per store visit. Combining this data with consumer store spending data leads to a value per vehicle visit. Using GPS location data derived from the vehicle the system can develop driving patterns, store visit locations, and visited store types which comprise valuable intelligence for retailers. Such intelligence may include, for example, metrics describing the frequency, timing, number and type of visits/occurrences, repeating patterns, financial and other value exchange, redemptions, purchase analytics and the like. The impact may be measured using a variety of methods such as including both quantative and qualitative, as are typically employed in analysis of advertising, promotion and marketing campaigns, such as conversion factors, upsell analytics, engagement metrics (such as time in store) and the like which are well known in the art. Over time, visitation trends and macro and micro level events affecting real world behavior can be determined. Combining vehicle location data with consumer demographics, mobile devices and app usage delivers the most accurate ad targeting capability.

In addition to the aforementioned benefits, the instant system and methodology allows for the acknowledgement that information received from a vehicle entertainment system is partial in nature, in that such information does not convey the context of the experience of a vehicle's occupants for a media event. The combination of verifiable proof of performance, through accurate time and location alignment combined with multiple media sources and contextual information provides a rich, accurate and immutable record of a vehicles occupants experiences. The information sets for traditional methods, center on a single source, a vehicle's inbuilt radio, whereas modern vehicles today include entertainment systems that support, radio, other hard media such as CD, USB and the like and connected sources such as embedded wireless modems and smart phones. Even the purveyors of systems that track podcasts, one of the most rapidly growing media sources of today, state that listening behavior cannot be monitored.

The use of an immutable repository, such as a distributed ledger, to record the timing and location information is complemented by the use of cryptographically bound containers, which span a period of time, with a granularity that can differ from the underlying blocks of the distributed ledger to provide further benefits over the prior art systems.

The foregoing attempts in the prior art fail to meet the needs of the industry, and the various stakeholders thereof. There exists significant industry demand, from the stakeholders identified above, for a more comprehensive in-vehicle media consumption measurement system that can provide greater accuracy, finer granularity and real-time measurement/analysis of media content consumption across all applicable sources—such a system does not exist today.

SUMMARY OF THE INVENTION

The present invention preserves and improves the advantages of prior art monitoring, listening, and reporting systems and methods for cross channel in car media, including audio, video, local, and web-based applications and games, and other media types. In addition, it provides new advantages not found in currently available systems and methods and overcomes many disadvantages of such currently available systems and methods.

The invention is generally directed to the novel and unique system and method for cross channel in car media consumption measurement and analysis.

The invention meets the above-identified needs by providing a system, apparatus, method and computer software for obtaining, measuring and analyzing in real-time (or on such other basis that can be configured) all forms of media content that a driver or passenger may consume inside of an automobile in combination with a reference time base and a reference location base, both of which are immutably recorded in a form that can be independently verified. This includes, but is not limited to, AM/FM radio, Satellite Digital Audio Radio Service (SDARS), stored media such as CDs, MP3s, DVDs and MP4s, content streaming, internet radio, audio books, podcasts, text-to-speech content and other forms of content, including content routed to the In Vehicle Entertainment (IVE) system through integration with a smartphone, MP3 player, DVD/Blu-ray player, game console or other similar external Consumer Electronic (CE) device (via wired or wireless connectivity, including but not limited to USB, BLUETOOTH, Wi-Fi, etc.). The combination of an accurate time reference, and accurate location reference and multiple sources of information, which is represented by an event generated initially in real time, provides a unique insight into the multifaceted behaviors of vehicle occupants as they undertake journeys and are exposed to multiple sources of content.

Of particular significance is that the invention allows for the acknowledgement that information received from a vehicle entertainment system is partial in nature, in that such information does not convey the context of the experience of a vehicle's occupants for a media event. The combination of verifiable proof of performance, through accurate time and location alignment combined with multiple media sources and contextual information provides a rich, accurate and immutable record of a vehicles occupants experiences. The use of an immutable repository, such as a distributed ledger, to record the timing and location information is complemented by the use of cryptographically bound containers, which span a period of time, with a granularity that can differ from the underlying blocks of the distributed ledger to provide further benefits over the prior art systems.

The instant approach incorporates the use of a reference time base and a reference location base, both of which are immutably recorded in a form that can be independently verified. This time base and location base are then used to record events which are captured through the vehicle head unit (VHU). The events that are captured include those associated with the media and/or vehicle operations of the VHU. One embodiment of the overall system configuration provides for event sets which can be generated by at least one event source, such as a vehicle VHU or proxy thereof. The time and location information included in that event, can then be validated for integrity, including accuracy. The timing integrity processing, in part, can use a trusted time reference source, such as those provided by NIST, trusted network time or other reference sources. The location integrity processing, in part, can use a trusted location reference source, such as those provided by the Global Positioning System (GPS), or other reference sources. These events, complete with timing and location information, can be recorded in an immutable trusted set of distributed ledgers. Further event information sets, which have had their timing and location information integrity processed, and then correlated with the original event information sets and can be recorded in the appropriate trusted distributed ledgers. Analysis processing can be undertaken by a data analytics pipeline, comprising a set of analytics tools in any arrangement, which may then output information sets to both distributed ledgers and/or other repositories that are bound to those ledgers, and repositories for measurements, insights and reports.

In addition to the time and location related events generated by a VHU, further information sets may be integrated from additional sources pertaining to those events. These information sets may then be correlated with VHU event information sets to form further information sets. In some embodiments, such information sets may be bound to one or more reference timelines and/or one or more reference location bases to create an integrated multi source record of such events.

Additionally, the invention is able to measure "cross channel" in-vehicle media consumption consistently and comparatively across multiple content types and sources (e.g. AM/FM radio, SDARS, internet radio, stored media, satellite video, terrestrial video, IP streaming video, ATSC 3.0 broadcasts, etc.).

Also, of note is the invention's ability to provide not only better information on what content is being consumed, but incremental contextual information on how listeners respond to this content (such as changing station or skipping forward when they don't like what is playing, turning up the volume on favorite tracks, thumbs up, etc.). This incremental contextual information on how listeners respond to content for the first time provides the potential for a "feedback loop" to the creators/programmers of the applicable content (for example, allowing AM/FM radio stations to better understand how listeners respond to their broadcast, thus allowing them to enhance their programming to better meet their listener's preferences).

Another key factor is the invention's ability to measure in-vehicle media consumption using a much larger sample size than ever before contemplated due to the architectural approach that fully supports low-cost, large-scale deployment in millions of vehicles.

Also important is the invention's ability to provide real-time dynamic measurement of in-vehicle media consumption (compared to the extensive lag time between survey and report of the existing methodologies). Alternatively, the system can permit for real-time or periodic monitoring of the use of audio, video, display content and related data in a vehicle, via software installed in the head unit of a vehicle along with hardware to receive the data, audio and video signals/channels.

The measurement data and analysis from the invention may be provided to auto manufacturing companies, providers of media content (including those available currently and others that may be available in the future), advertising companies, platforms and agencies, the music industry and other interested parties.

The objective of the invention is to measure all applicable forms of media consumption in an automobile and to provide an immutable record of the time and location data associated with some or all of the measurements. This consumption will represent actual measured data rather than mere survey data (which is the only data available today).

Actual measurement and analysis of what media people consume while in a vehicle is important to multiple stakeholders, who are currently under-served by existing measurement services based on survey methodologies, including (but not limited to: 1) radio, television (and other content) advertising businesses to support the buying/selling and pricing of content advertising (the US market for radio advertising is valued at $17 billion in 2017 and television advertising revenue of $70 billion); 2) radio and television station owners and programming managers to guide their selection of programming and on-air talent; 3) the music industry and video production companies to gauge public reaction to artists and their work; 4) the automotive industry to understand the behavior of their customers; and 5) and any other entity that may be interested in the measurement and analysis of such media consumption.

The invention has been developed to provide a new level of in-vehicle media consumption measurement capability achieving the following objectives:

1. A substantially higher level of accuracy and granularity by using actual data measurement from a large sample population (rather than survey measurement from a small sample).
2. Provide an approach that makes large sample measurement viable by significantly reducing the per-vehicle installation and operational cost, and thus allowing widespread deployment in millions of vehicles
3. Provide the ability for real-time measurement and analysis, to meet the industry requirement for dynamic data.
4. Provide the ability to measure content from multiple sources in a consistent and comparable way (to include broadcast or internet services such as video sources, AM/FM radio and SDARS, personalized services such as PANDORA, IHEART RADIO, HULU, NETFLIX, etc., stored media content such as CD, MP3 and DVD/Blu-ray players and content sourced from a connected CE device (including various platforms for in-vehicle smartphone integration such as APPLE CARPLAY, GOOGLE ANDROID AUTO, HARMAN AHA RADIO, PANASONIC AUPEO, PIONEER ZYPR, FORD SYNC, MIRRORLINK, AIRBIQUITY CHOREO, HULU, VIMEO, YOUTUBE, COX, COMCAST, VERIZON, NETFLIX, HBO, AMAZON PRIME, etc.).

5. Provide more detailed metadata relating to what is actually consumed (such as song title, artist name, etc.). Such metadata may be achieved both through direct collection in the IVE and also through timestamp matching of the media source (e.g. a particular satellite radio channel) with a play list of the same content source captured separately.

6. Provide contextual data relating to the user's consumption behavior (such as turning up the volume during a favorite song, changing channel when the DJ is annoying, etc.)

7. Support analysis of different consumption habits in vehicles when used by different people (e.g. members of the same family) and in different situations (e.g. commuting alone vs. a weekend family road trip).

8. Allow determination of vehicle user demographics by merging and cross-referencing available, known data (such as vehicle VIN and vehicle owner information) with other sources of third-party data (such as cell phone UDID and user data) to provide more comprehensive analysis of vehicle usage and operator demographics.

9. Provide geographically referenced data to allow a more complete pattern of user behavior to be determined.

10. Provide listening and viewing habits in all makes and models of vehicles and in varying regions of the U.S.

11. Provide an industry-scale platform with capabilities for future expansion of additional capabilities, including but not limited to, such services as verification of audio and video ads (including the specific ID of such audio/video ad) actually played in vehicles, delivery of personalized audio/video ads into the vehicle, etc.

12. Provide an immutable record of all such collected data to ensure the accuracy and veracity of the data sets which in turn provides added value to the measurements and resulting determinations and reports.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Referring to FIGS. 1-15 of the present invention, it is common today for content from many different sources to be consumed in a vehicle, and for these sources to utilize a multitude of technologies to deliver the content into the vehicle (e.g. AM/FM radio, SDARS, stored media players, cellular wireless, IP technologies, terrestrial and satellite video signals, ATSC 3.0, BLUETOOTH integration of CE devices, etc.). In order to effectively and comparatively measure actual media consumption from any and all of these sources, it is necessary to conduct measurement at a point in the system that has visibility of content played from any and all of these sources. The In Vehicle Entertainment (IVE) system, also known as the vehicle "head unit" is the only point at which content from each and every source can be measured—this is because the IVE controls all media playback in the vehicle through the built-in amplification, speaker systems and display screens. The information sets for traditional methods, center on a single source, a vehicle's inbuilt radio, whereas modern vehicles today include entertainment systems that support, radio, other hard media such as CD, USB and the like and connected sources such as embedded wireless modems and smart phones. Even the purveyors of systems that track podcasts, one of the most rapidly growing media sources of today, state that listening behavior cannot be monitored.

A key tenet of the system described herein is acknowledging that information received from a vehicle entertainment system is partial in nature, in that such information does not convey the context of the experience of a vehicle's occupants for a media event. The combination of verifiable proof of performance, through accurate time and location alignment combined with multiple media sources and contextual information provides a rich, accurate and immutable record of a vehicles occupants experiences.

The use of an immutable repository, such as a distributed ledger, to record the timing and location information is complemented by the use of cryptographically bound containers, which span a period of time, with a granularity that can differ from the underlying blocks of the distributed ledger.

Figure 1:
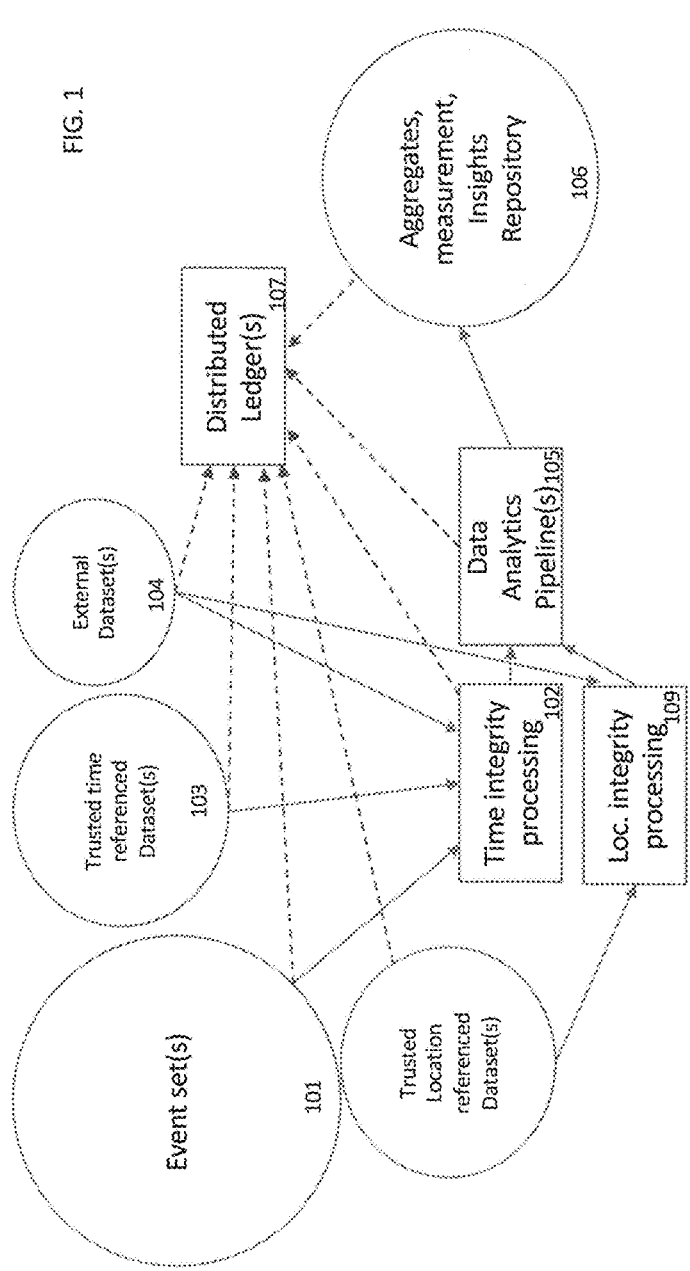
FIG. 1 is a diagram of one embodiment of the data analytics processing system.

The invention is generally directed to the novel and unique system and method for cross channel in-car media consumption measurement and analysis. As generally shown in FIG. 1, this approach incorporates the use of a reference time base and a reference location base, both of which are immutably recorded in a form that can be independently verified. This time base and location base are then used to record events which are captured through the vehicle head unit (VHU). The events that are captured include those associated with the media and/or vehicle operations of the VHU, e.g. operation of the entertainment system, vehicle control systems (e.g. windshield wipers, lights, turn signals, etc.), the vehicle ignition, etc. FIG. 1 illustrates an embodiment of the overall system configuration, including event sets 101 which are generated by at least one event source, such as a vehicle VHU or proxy thereof. The time and location information included in that event, is then validated for integrity, including accuracy 102, this can be performed locally or remotely on a separate server. The timing integrity processing, in part, uses a trusted time reference source, such as those provided by NIST, trusted network time or other reference sources 103. The location integrity processing, in part, uses a trusted location reference source, such as those provided by the Global Positioning System (GPS), or other reference sources 109. These events, complete with timing and location information, are recorded in an immutable trusted set of distributed ledgers 107. Further event information sets 104, which have had their timing and location information integrity processed, and then correlated with the original event information sets and are recorded in the appropriate trusted distributed ledgers. Analysis processing can be undertaken by a data analytics pipeline 105, which can include a set of analytics tools in any arrangement, which may then output information sets to both distributed ledgers 107 and/or other repositories 106 that are bound to those ledgers, and repositories for measurements, insights and reports.

In use, each event will occur at a specific time and location, where the time attributes for that event can be configured as a start, duration, and end times. All three times may be coincident or may vary depending on the type of event being monitored. The recording of such time and location, of the event, is dependent on the local measure of time and location being utilized. For example, a Vehicle Head Unit (VHU) in the vehicle may have an internal time reference with which events created or monitored by such VHU are recorded with, for example, at least one time stamp and may include a Global Navigation Satellite System (GNSS) which provides at least one set of location coordinates.

These time stamps may be locally accurate, however they may differ to a greater or lesser degree to an accurate reference time, such as that provided by the National Institute of Standards and Technology (NIST), network time and the like. A system may select a reference time which is stored in an immutable format, for example as a blockchain, and any VHU generated time stamp can then be correlated to such a reference time to create an offset for that VHU such that the events of that VHU are accurately correlated to the reference time.

This correlation may be configured through use of multiple sources for the same event, aggregation of multiple VHU time information sets, integration of co-located devices with a reference time, for example a smart phone with network time and other well-known techniques.

The system can establish a reference and accurate time line based on at least one network/reference time. This time reference can be recorded in such a manner that the time the recorded time is immutable, for example using distributed ledgers employing at least one blockchain.

A timeline, in some embodiments may comprise sequential time increments, measured in units of time, for example seconds, minutes or portions thereof. These time units may form segments with differing granularities, where each segment is bound to the reference time in a manner that is immutable. For example, a reference time line may have bound to it multiple segmented time spans, where such segments are aligned with the types of content to be monitored and/or may form part of an event container or other event information management configurations.

Figure 2:
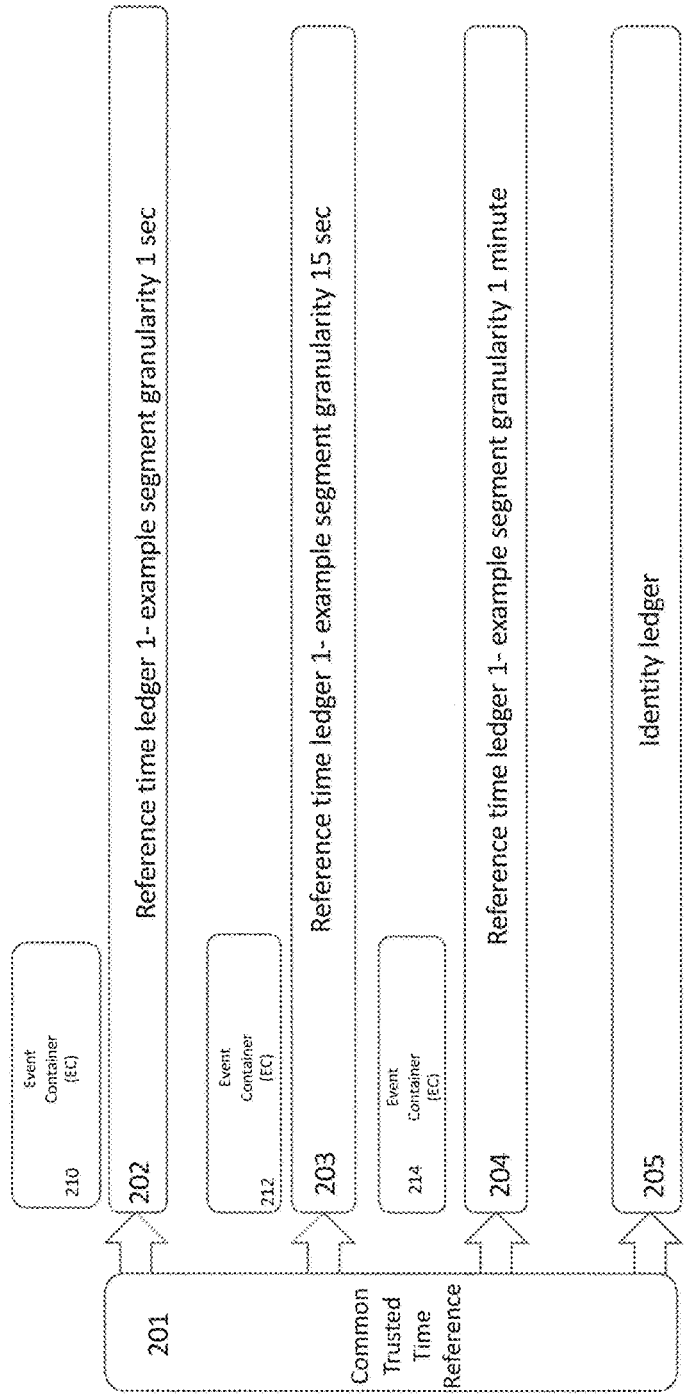
FIG. 2 shows one embodiment of multiple reference ledges derived from a single trusted time reference.

In FIG. 2, a reference time line 201 can provide a single trusted point of reference for all reference time ledgers 202, 203, 204 bound to this common trusted time reference 101. Each of the time ledgers 202-204 may comprise segments of differing granularity to which events may be bound, through for example event containers 210, 212, 214. In the illustrated example, the reference time ledgers 202-204 can be aligned to events captured that are content specific, such as advertising parameters including advertising segments and radio programs, podcasts or other linear programming.

Figure 9:
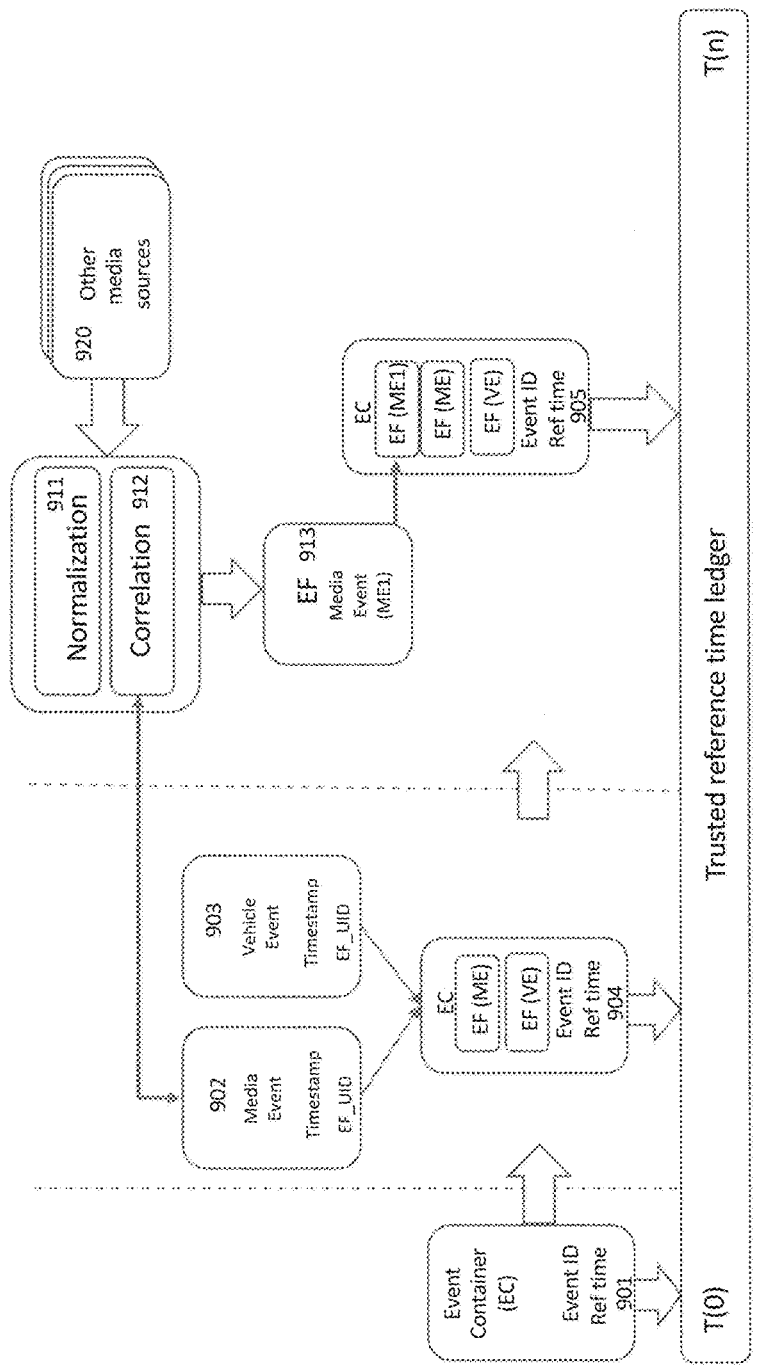
FIG. 9 shows one example of vehicle generated events with a trusted timeline.

The time information that comprises each of the time ledgers 202-204, may in some embodiments, be expressed as a differential from a starting time T0, see FIG. 9 for example, where such a time is cryptographically expressed such that T0 is not able to be calculated from the information in the time ledger. For example, information may be represented from a start time T0, such as indicated by a vehicle event, and the subsequent events may have their times represented relative to that time. This information may be useful when presenting information that refers to the journey conditions, such as time travelled at specific speed bands, numbers of halts (at stop signs or traffic lights) or other journey information, such that the media events are represented within this context. For example, changing from an entertainment stream to a local radio station for traffic information or seeking a particular style of music and the like. This information may also include reports to media customers where the time is based on the start of an event, such as a particular song or program where the length of time or the volume control or other audio control use is of interest.

An event, from the event set 101, can be an information set that is generated as an outcome of at least one action. Each event can include at least one time stamp and at least one set of information that describes an action. A location can be associated with this event, as noted above. A unique identifier (UID) can be associated with such an event, where this identifier is sufficiently unique to support evaluation, management and/or processing of that event. Such a unique identifier can be used to anonymize a user such that no identifiable information about the user is transmitted to the data analytic pipeline.

Events may be created or generated from multiple sources including VHU and/or proxies thereof, broadcast and other content sources, one or more devices connected to a VHU, aggregation of VHU information sets, including those that have undergone one or more processing and/or configuration steps, and/or other sources.

Each event has a time stamp or may occur within a specific time period. In all cases, the system will normalize the time information to conform to an underlying reference time ledger 202-204, such that the event is immutably bound to the underlying time reference 205.

This normalization process may be configured to incorporate the information provided in the event information set, information derived, extracted or processed from other information sources that have been determined to be related to that event and/or other information sources that increase the accuracy, consistency and other metrics of the resulting time information.

Figure 3:
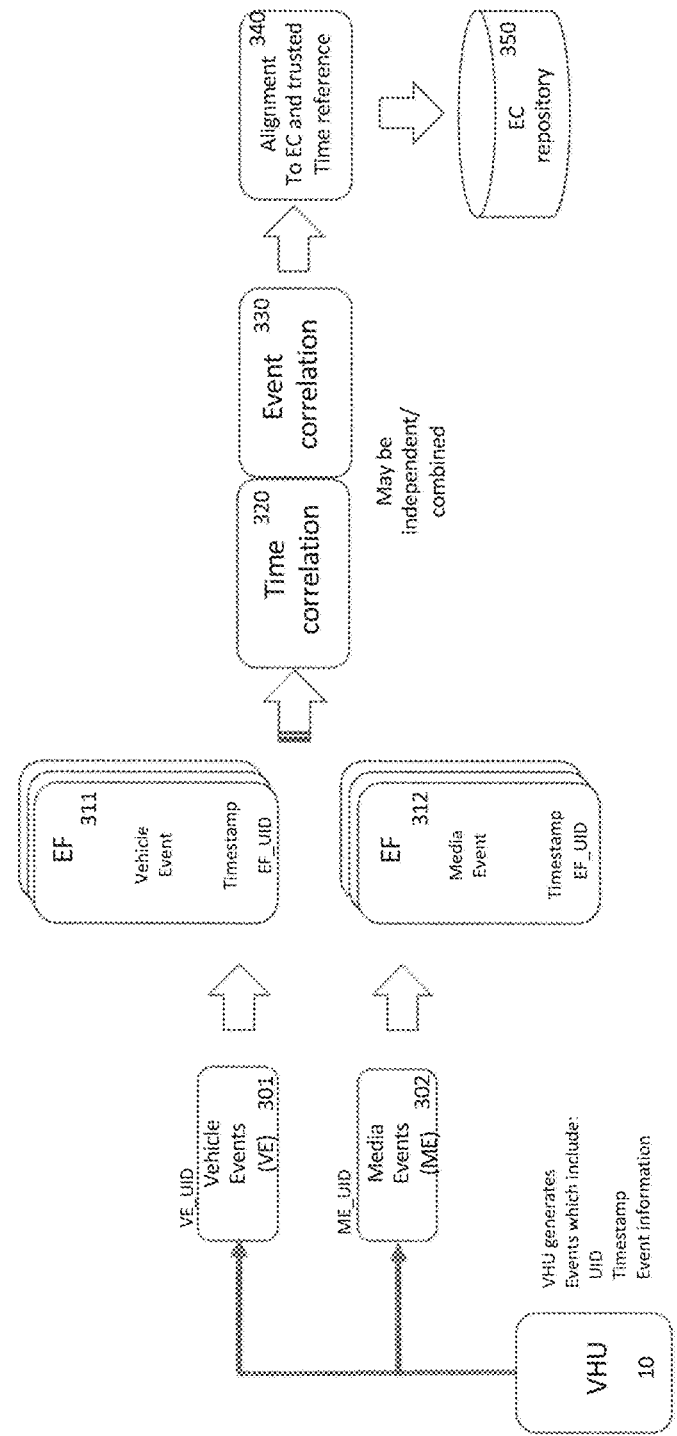
FIG. 3 shows two event frameworks created from a single head unit.

In some embodiment's events may be of differing types, as illustrated in FIG. 3, where each event is identified as, for example, a media event 302 or a vehicle event 301 and in some cases other types that may be classified as event types. These event types 301, 302 may then be incorporated into an event framework 311, 312. These events may be combined into a single event framework for some operations, though each event type is an attribute of such event. The assignment of the UID for each type may take place in the VHU, on receipt by an event framework or by other processes subsequent to the event instantiation.

Time correlation 320 and event correlation 330 illustrate an embodiment where these respective processes are undertaken prior to such event frameworks being bound to at least one event container including a repository of event containers 350 that have been instantiated and are bound to a reference time ledger via an alignment model 340.

Each of the aforementioned events can include at least one of time and event information sets 311, 312. Time information can be expressed as at least start and end and may include duration. The time information may include one or more timestamps of any granularity or accuracy. For example, an event may occur over a time period, for example a minute or similar. In some embodiments, time stamps may be evaluated, including to establish their accuracy and may be configured, though normalization processing, to conform to an immutable time line. The time information may include correlating an event with other records of such an event to establish an accurate time, where for example the granularity of that time is insufficiently accurate. For example, if the time information is provided at a granularity of minutes, this may be evaluated and validated against other more accurate timing information for the same event so as to ascertain a more accurate timing.

Figure 4:
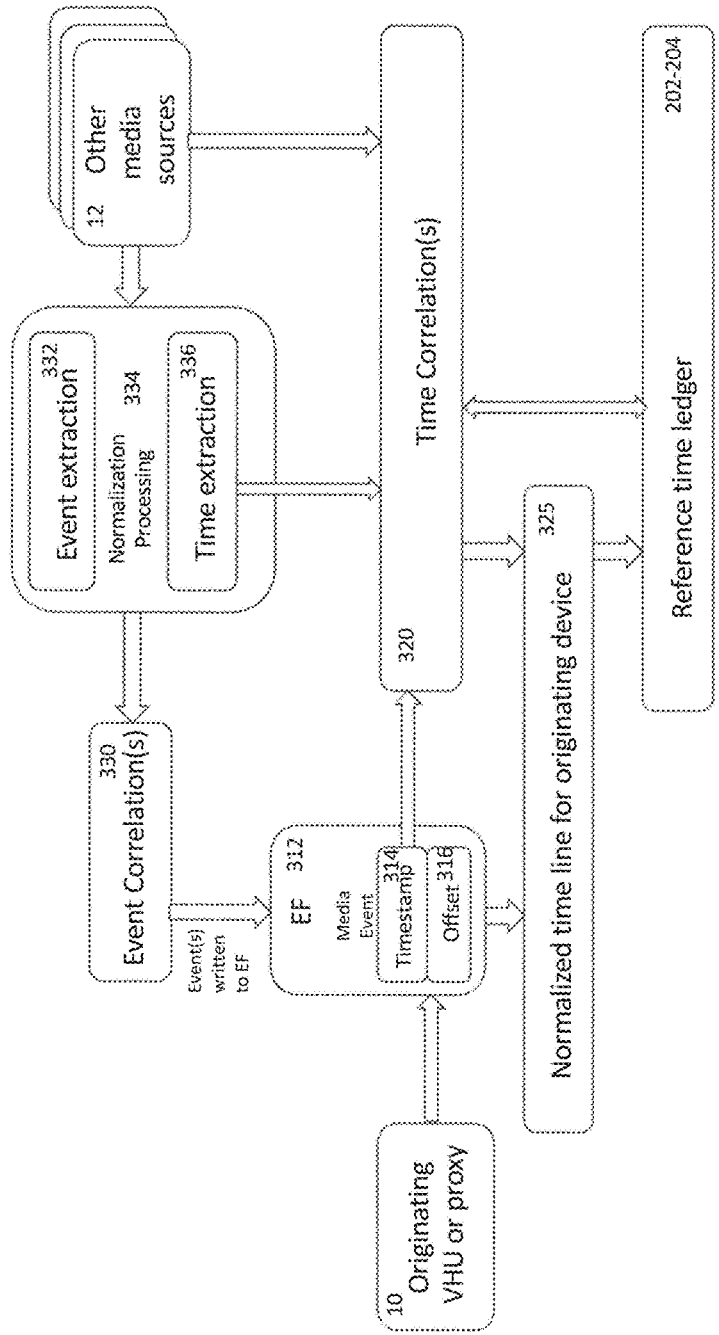
FIG. 4 shows an example of media information being added to an event framework.

FIG. 4 illustrates an example of a media event generated by a VHU 10 or proxy thereof, instantiated as an event framework 312, with a time stamp 314, which when evaluated for accuracy by a time correlation process 320 in light of a further media source 12 which has been determined represent the same event, through an event correlation process 330 and has been determined to be more accurate when compared with the reference time line ledger e.g. 202-204, corrects the initial time stamp 314 as a normalized time, configured in some embodiments as a normalized timeline for that originating VHU 325, and writes this correlation as an offset 316 to the original time stamp 314, aligning the event framework that includes the at least one event to the reference time ledger. The other media sources 12 may be evaluated and processed by a normalization process module 334, which extracts the event information sets 332 and the time information sets 336 from such other media sources and passes these to the event correlation 330 and time correlation 320 processes respectively.

As noted above, in addition to, or in place of timing measurements, one aspect of the system is the relationship between the experience of a vehicles occupants and the locations at which that experience and the events generated thereby occurred. As a vehicle moves from one location to another at various times, the content they are exposed to may vary, for example as vehicle undertakes a journey from one market area to another or moves form one local radio station area to another. This may include long distance travel, such as when occupants of a vehicle undertake a holiday or similar.

The granularity of this location information may, in part, be determined by VHU information derived from vehicle GPS or other navigation systems. In some embodiments this may be augmented and/or updated by other device information, such as from a smart phone using a mapping and/or directions system. The availability of this information may depend, in part, on occupant providing access to this information independent of the VHU, for example through an application with an opt in function and/or through integration with a VHU whereby the location information is passed to the VHU.

Location information may have limited accuracy and granularity, depending on the source of this information and the commercial and regulatory limitations that are in operation at the time. Locations may be mapped for a vehicle or set thereof, such that a set of waypoints and associated time stamps are identified for repeated journeys, such that a pattern that represents such a journey may be retained in at least one repository and media and/or vehicle events tracked against that pattern. These waypoints may be correlated to one or more digital map representations and as such waypoints can be expressed in terms of the roads that the vehicle is traversing during the journey. In this manner any variations in the received location data are normalized to the roads that are available for the vehicle to operate upon. In this manner, when an event is inconsistent with a pattern an exception may be raised which can then be used for further processing. For example, the exception may initiate a further location tracking granularity, in relation to locations associated with the content being broadcast or experienced at that time. For example, if an offer is made by an advertiser and a vehicle with an established journey pattern undertakes a deviation from that pattern to the location of the provider of the offer, certain real time effects may be configured and instigated. For example, if the user's devices have a connection to the VHU which includes a unique identifier, such as a MAC address or BLUETOOTH ID, then this information may be provided to the destination location and a user on entering such location may be presented with an offer or set thereof.

In some embodiments, each event may include a reference to at least one location, for example a VHU may provide location information from the vehicle global navigation satellite system (GNSS) or similar and/or an entertainment device used by at least one occupant may communicate location information. These attributes may be the vehicle specific and/or may be aggregated into sets of vehicles. These locations may be referenced to a mapping systems, which includes the locations of Points Of Interest (POI), such as buildings, infrastructure, roadways and the like. This may include POI that are associated with advertisers whose content is available to a vehicle's occupants.

In some embodiments where a vehicle includes a wi-fi hotspot the integration of a user's devices may be such that each of the occupant's individual experiences may be monitored, through determination of the unique identity of the vehicle and any devices operating therein, for example, a MAC address or other device identification, and where appropriate the broadcast, multicast, stream and/or communications methods with which those devices are associated.

Figure 5:
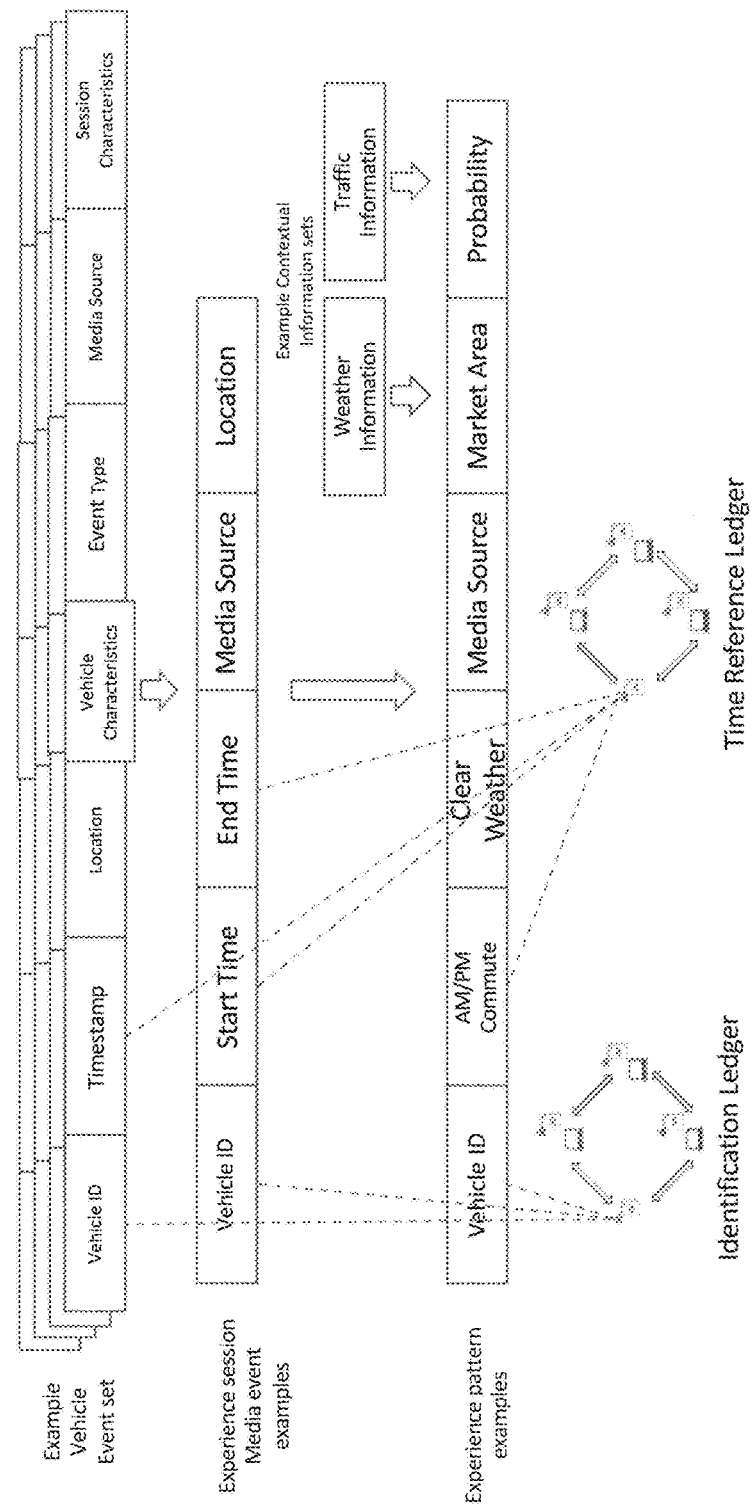
FIG. 5 shows example event sets with a media source.

FIG. 5 illustrates an example event sets 501a, 501b, 501c for vehicles and media event sets 530 which may form, in whole or in part a such a pattern 550. An example vehicle event set 501c may comprise a number of information elements, such as those illustrated in FIG. 5, including vehicle identity (which may be anonymized), time stamp information, location information, vehicle characteristics, event type, media source and session characteristics. For each of these elements there may be at least one data element, such as a key value pair, attribute value pair, name value pair or other information organization format. In some cases, there may be multiple information sets organized in any arrangement, however each of which having an associated time stamp.

An example media event 530 may span a session, representing a set of media events over a time period and/or a journey. In this example each element may also comprise at least one data element, such as a key value pair, attribute value pair or other information organization format. In this example time stamps are classified by their occurrence so as to create a timeline for the session.

FIG. 5 additionally illustrates the use of distributed ledgers, for both identity and time information 205, 202-204, providing an immutable record of the occurrence of these events related to a trusted reference time source. Example patterns are also illustrated in FIG. 5, where such a pattern may include a set of elements, including those directly derived from the vehicle and media events and further information sets that have been correlated to the events of both the vehicle and media event sets. For example, the type of journey may be classified, such as the AM/PM commute illustrated in FIG. 5. The weather for the journey may also be included, as may traffic information, including probability based metrics, which may have influenced the selection of media sources, and consequently media event s for the journey. Other elements may include market segmentations or other market associated classifications which may then be used in the requisite reports provided by the overall system.

In addition to the timing and location information, combinations of information representing a state of a vehicle or a vehicle's infotainment head unit at the moment an event occurs can be represented as an information set, including event attributes such as those described herein. The following are examples of event attributes within an example framework of events:

```
"eventReport": {
   "header": {
"reportId": "9F7648C765964A23AC45708726903709",
"anonymousCarId": "XY0677052M92",
"agent": "OEM1-HU02-AGENT3",
"carAgentVer": "2.2",
"protocolVer": "1.1.0",
"timestamp": "2018-08-31T09:07:34Z",
"locationAccuracy": 3
},
"eventSet": [{
   "eventId": "D548C5D59C8F4F71A2D4B20341524D6B",
   "event": "CAR_STATUS_CHANGE",
   "timestamp": "2018-08-31T07:05:25Z",
   "location":{
     "type":"Point",
     "coordinates":[-118.138,34.154]
   },
   "attributes":{
     "ignition":"On"
   }
},{
   "eventId": "D77005DCAAC44772BCA977749B4DD502",
   "event": "VHU_MEDIA_SOURCE_CHANGE",
   "timestamp": "2018-08-31T07:05:25Z",
   "location":{
     "type":"Point",
     "coordinates":[-118.138,34.154]
   },
   "attributes":{
     "source":"CD",
     "volume":24
   }
},{
     "eventId": " 59CCB9298378424398D174C320FD0605",
     "event": "VHU_MEDIA_SOURCE_CHANGE",
     "timestamp": "2018-08-31T07:06:30Z",
     "location":{
       "type":"Point",
       "coordinates":[-117.989,34.092]
     },
     "attributes":{
       "source":"Tuner",
       "band":"FM",
       "frequency":"89.3"
       "volume":24
     }
},{
     "eventId": "0BD9A1DB40144FF28218F679ECB589DE",
     "event": "VHU_VOLUME_CHANGE",
     "timestamp": "2018-08-31T07:06:40Z",
     "location":{
       "type":"Point",
       "coordinates":[-117.989,34.092]
     },
     "attributes":{
       "volume":30
     }
},{
     "eventId": "145B530D962F47A998EDB8CEAACE9033",
     "event": "VHU_STATION_CHANGE ",
     "timestamp": "2018-08-31T08:36:33Z",
"location":{
   "type":"Point",
   "coordinates":[-118.138,34.154]
},
"attributes":{
   "source":"Tuner",
   "band":"FM",
   "frequency":"91.9"
   "volume":30
}
},{
"eventId": "15388931C35646C28D7F80E9B345BA54",
"event": "CAR_STATUS_CHANGE",
"timestamp": "2018-08-31T09:07:30Z",
"location":{
   "type":"Point",
   "coordinates":[-117.805,34.111]
},
"attributes":{
   "ignition":"Off"
}
}
]
```

An information set is expressed as the content of the event, such as for example a change in the controls of a VHU, including for example change in volume, content source, radio station, muting, incoming or outgoing phone call and the like. The expression of such event information may vary according to the information sets received from the VHU and may then be configured to a consistent format for further evaluation and/or correlation with other information sets representing events.

In some embodiments, the level of detail provided by a VHU (and/or aggregations thereof) may not match a level of detail sufficient to accurately match other representations of that event. This situation may be mitigated by applying one or more probability techniques to ascertain a level of certainty that two events may match each other. This is considered further below. Information comprising an event may be evaluated for, accuracy, specific one or more features, one or more content attributes and/or other characteristics. The following shows a possible result of correlating the event attributes from the previous example with market geographic boundaries and radio station information:

```
"eventReport": {
   "header": {
"reportId": "9F7648C765964A23AC45708726903709",
"anonymousCarId": "XY0677052M92",
"agent": "OEM1-HU02-AGENT3",
```

```
        "agentVer": "2.2",
        "protocolVer": "1.1.0",
        "timestamp": "2018-08-31T09:07:34Z",
        "locationAccuracy": 3,
        "process": ["MARKET-ANNOTATION-1.01",
"RADIO-STATION-ANNOTATION-1.8"]
    },
        "eventSet": [{
            "eventId": "D548C5D59C8F4F71A2D4B20341524D6B",
            "event": "CAR_STATUS_CHANGE",
            "timestamp": "2018-08-31T07:05:25Z",
            "location":{
                "type":"Point",
                "coordinates":[-118.138,34.154]
            },
            "attributes":{
    "ignition":"On"
},
"MSA": "Los Angeles"
},{
"eventId": "D77005DCAAC44772BCA977749B4DD502",
"event": "VHU_MEDIA_SOURCE_CHANGE",
"timestamp": "2018-08-31T07:05:25Z",
"location":{
    "type":"Point",
    "coordinates":[-118.138,34.154]
},
"attributes":{
    "source":"CD",
    "volume":24
},
"MSA": "Los Angeles"
},{
"eventId": "59CCB9298378424398D174C320FD0605",
"event": "VHU_MEDIA_SOURCE_CHANGE",
"timestamp": "2018-08-31T07:06:30Z",
"location":{
    "type":"Point",
    "coordinates":[-117.989,34.092]
},
"attributes":{
    "source":"Tuner",
    "band":"FM",
    "frequency":"889.3"
    "volume":24,
    "station":"KPCC-FM"
        },
        "MSA": "Los Angeles"
        },{
            "eventId": "0BD9A1DB40144FF28218F679ECB589DE",
            "event": "VHU_VOLUME_CHANGE",
            "timestamp": "2018-08-31T07:06:40Z",
            "location":{
                "type":"Point",
                "coordinates":[-117.989,34.092]
            },
            "attributes":{
                "volume":30
            },
            "MSA": "Los Angeles"
        },{
            "eventId": "145B530D962F47A998EDB8CEAACE9033",
            "event": "VHU_STATION_CHANGE ",
            "timestamp": "2018-08-31T08:36:33Z",
            "location":{
                "type":"Point",
                "coordinates":[-118.138,34.154]
            },
            "attributes":{
                "source":"Tuner",
                "band":"FM",
                "frequency":"91.9"
                "volume":30,
                "station":"KVCR-FM"
            },
            "MSA": "Los Angeles"
},{
"eventId": "15388931C35646C28D7F80E9B345BA54",
"event": "CAR_STATUS_CHANGE",
```

```
"timestamp": "2018-08-31T09:07:30Z",
"location":{
    "type":"Point",
    "coordinates":[-117.805,34.111]
},
"attributes":{
    "ignition":"Off"
},
"MSA": "Los Angeles"
}
]
```

Example of Ad Attribution

Figure 6:
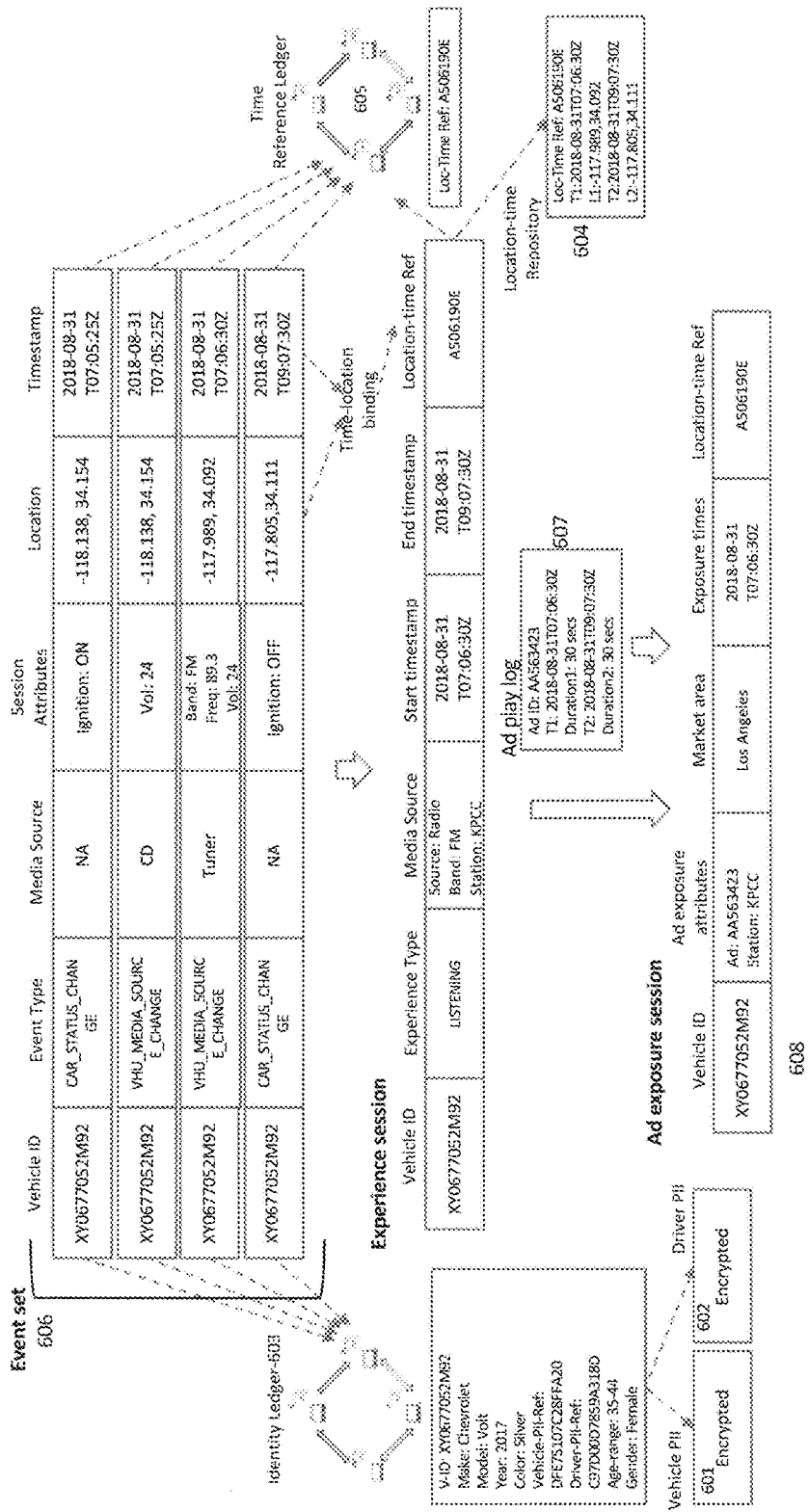
FIG. 6 shows an example event used for ad attribution.

In the example illustrated in FIG. 6, personally identifiable information (PII) of the occupants, in this example the driver, 602 and/or their vehicle 601 is stored separately in encrypted data storage. References to this information as well as business-relevant attributes of vehicle and/or occupants are recorded on an immutable identification ledger 603 as the identity ledger.

The location-time combinations of the events in the event set for the vehicle are also stored separately in a location-time data repository 604 (which may be encrypted) and references to them are recorded in the time reference immutable ledger, illustrated as time reference ledger 605.

Figure 7:
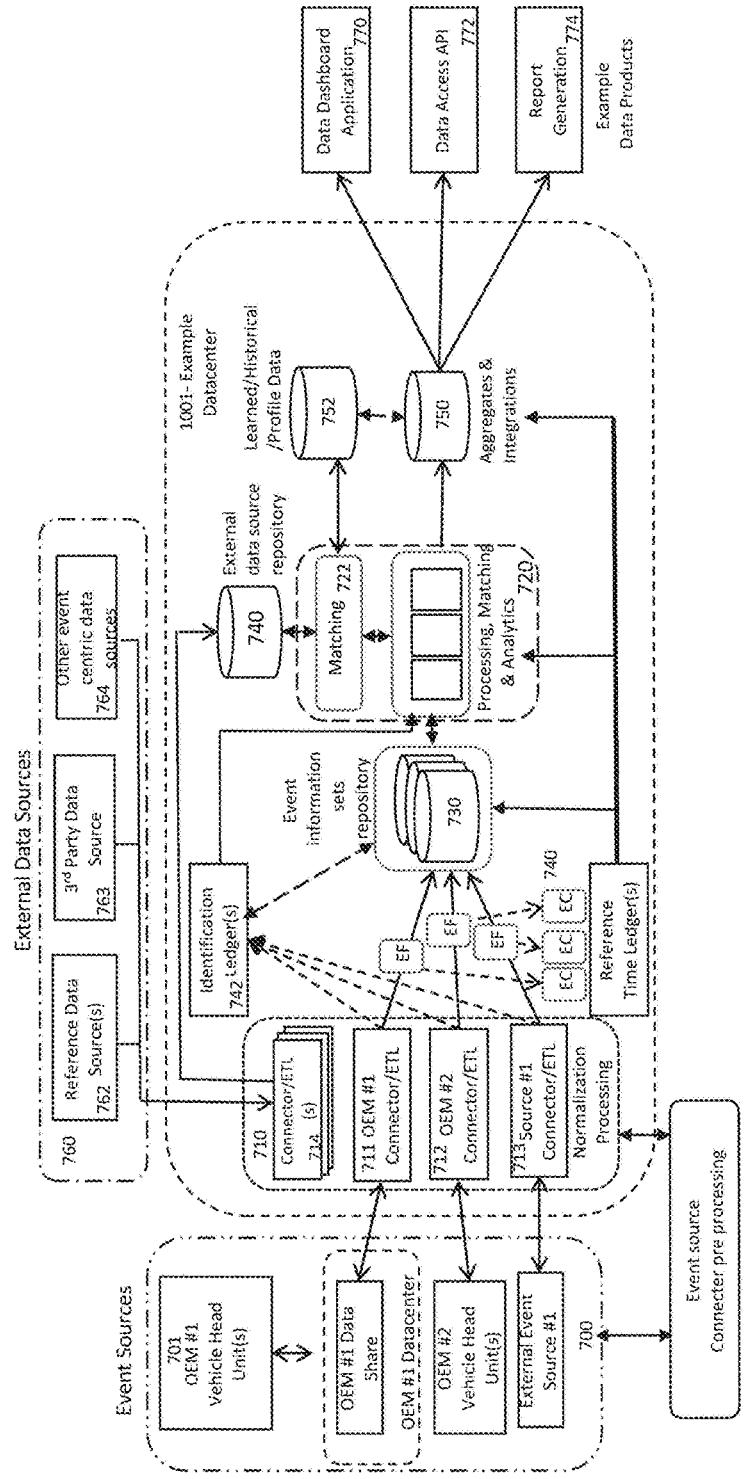
FIG. 7 shows one embodiment of the system architecture.

A set of listening experience sessions can be obtained by combining the event set 730 with reference data, as illustrated in FIG. 7. Every particular listening experience will then contain business-relevant attributes, such as source and station, along with references to associated location-time references. When necessary, the location-time reference or the anonymized vehicle identifier can be used to verify/certify the experience session, by reviewing the references stored the identification ledger and in the time reference ledger. The location-time references stored in the ledger can be verified in the location-time repository, by authorized agents with appropriate access rights.

The listening experience attributes, as shown in FIG. 6, can be compared with ad play logs 607, identifying, in whole or in part, overlaps between ad play times with listening session times on the same media sources (e.g. radio stations), in order to generate ad exposure sessions 608, which can be combined with individual attributes, such as demographic classification, and aggregated from multiple vehicles to produce measurements of total exposure of an ad campaign, such as number of unique exposures, exposures per station, per demographic group, per market area, per time of day, per day of week, exposure rate, etc.

Additionally, in some cases location-time combinations from the event sets and from other sources can be compared with advertised business locations in order to identify visits made by reporting vehicles to such business locations and co-relate such visits with exposures to related ads in order to identify conversions, which represent visits to an advertised business that are likely caused by one or more exposure to ads. These visits and ad conversions can also be combined with individual attributes, such as demographic classification, and aggregated from multiple vehicles to produce measurements such as exposure-visit rate, visits or conversions by day, by time of day, by demographic group, by market area, conversion rate, etc.

Ad exposure sessions, visits, ad conversions and the resulting aggregates can be verified, by reviewing the references stored in the identity and time reference ledger and by confirming the information referenced from therein and stored in separate PII and location-time repositories.

Event Monitoring

In addition to the ad-attribution scenario described above, events can be monitored by multiple system elements, including those incorporated into a VHU, in communication with VHU and/or other event generation sources. In some embodiments, an initial action is generated by a VHU, with the system responding to an action by initiating at least one event monitoring system operation, where such event monitoring is configured to capture such generated action. This initial event may be recorded in a manner that is immutable, for example it may be written to a distributed ledger, such as a blockchain and/or be hashed so as to create a unique record of the event.

In some embodiments, each event has a set of attributes including:

1) User Identification (UID), which may contextually or system wide unique
2) At least one timestamp
3) At least one location
4) At least one information set pertaining to event
5) An event classification/type
6) At least one source UID relating to the vehicle, VHU, occupant, device any of which may be anonymized and/or may be combined in any arrangement For those media sources that broadcast their content through multiple mediums, for example by radio (FM/AM) and internet, these alternative distribution mediums may be captured and analyzed for their content and associated timing information, for example using, meta data, audio fingerprinting or other techniques. These streams may be used to correlate that certain media events within a location area, for example a broadcast market, took place and may provide further timing information, which can be reconciled with event information received from a VHU or proxy thereof. The reconciliation of this timing information from alternative sources may also be correlated to the reference time ledger to enhance the overall accuracy of the system. This information may be added, for example to an event framework. These information sets may be used to confirm the sequence of broadcast content, in where that information is not provided by a VHU or proxy thereof, create a set of events for such VHU based on the time and location based correlation of this information set. This may include using this information for assigning probabilities to events and information sets received from a VHU or proxy thereof. Time correction may be undertaken through provision of timing information derived from third party providers, such as those that have applications on the one or more devices of the occupants. This may include those location based applications, such as Waze, mapping applications, such as those provided by Google or Apple and the like.

In some embodiments the matching of timing information from VHU events with events from other sources, such as location-based smartphone applications, may be used to handle cases of missing or incomplete information. For example, if the sample events presented in the example events above didn't include location, but there was location information available from a mobile application for the same user who drives the vehicle, it would be possible to match time of VHU and mobile application event sets. If matches are found, within a specific tolerance, the locations from the matching mobile application events can be used as locations for the VHU events. If the match is not exact, it may be possible to use time difference in combination with speed, location sequences, road network and the like to estimate the location at the time the VHU events occur. This technique and variations of it can also be used to extend the reach of VHU events, for example, to include driver activities and behaviors that take place before entering or after leaving the vehicle. This can be used in cases such as solving ad attribution requirements, by finding out the effect of advertising campaigns in users, by identifying the users or number of users who go to the advertised places.

Example Embodiment

Each of the time segments recorded in a time ledger, 202-204, as shown in FIG. 2, may have multiple associated events, where such association may be bound to a segment in a cryptographically secure form. One or more events may be configured to be included in an event container, which is written to a blockchain that, in part, incorporates a reference time ledger 210, 212, 214. Each event container may have a UID 801, as illustrated in FIG. 8.

Each event container may form a part of a reference time ledger 202, 203, 204, where the time duration of the container may be quantized to cover a specific period of time. For example, such a period may be consistent with the content being monitored and any reporting thereof.

Figure 8:
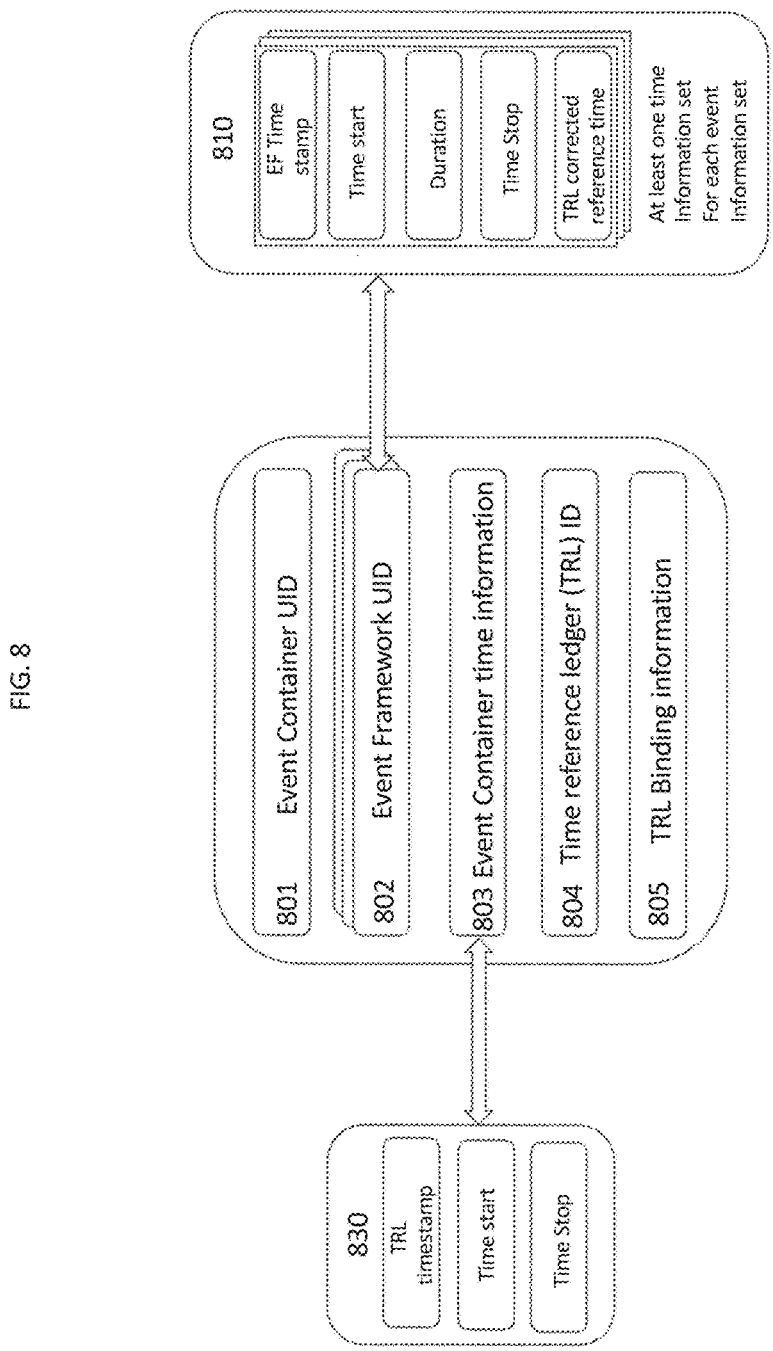
FIG. 8 shows one embodiment of an event container.

An event container, as a repository for event information may contain multiple event information sets 801, as shown in FIG. 8, which may be recorded into an event container at differing time intervals. These sets 801 may be identified by the event framework unique identity, which in turn may include timing information that is associated with such event framework 810. For example, an initial event generated by a VHU or proxy thereof may be instantiated into one or more event containers, and at a subsequent time further information sets which are correlated with that initial event information set may be added, by reference or embedding, to an event container.

An event container may include at least one of an event start time, duration and/or end time, depending on the time periods of the event 803, with such information including the time stamp, time start, and time stop 830. For example, if a VHU generated event is a change of radio channel, then this would be recorded as an event with a start and end time that are the same. However, this event may form part of an event with a longer period, for example if a user switches to another channel to avoid specific content, such as a news bulletin, pledge drive or advertising.

For example, an event container can be written to a blockchain that can be immediately or subsequently bound through one or more relationships to one or more event frameworks and/or the contents thereof 804, and the binding information 805 associated with such relationship may be recorded, as illustrated in FIG. 8.

Figure 10:
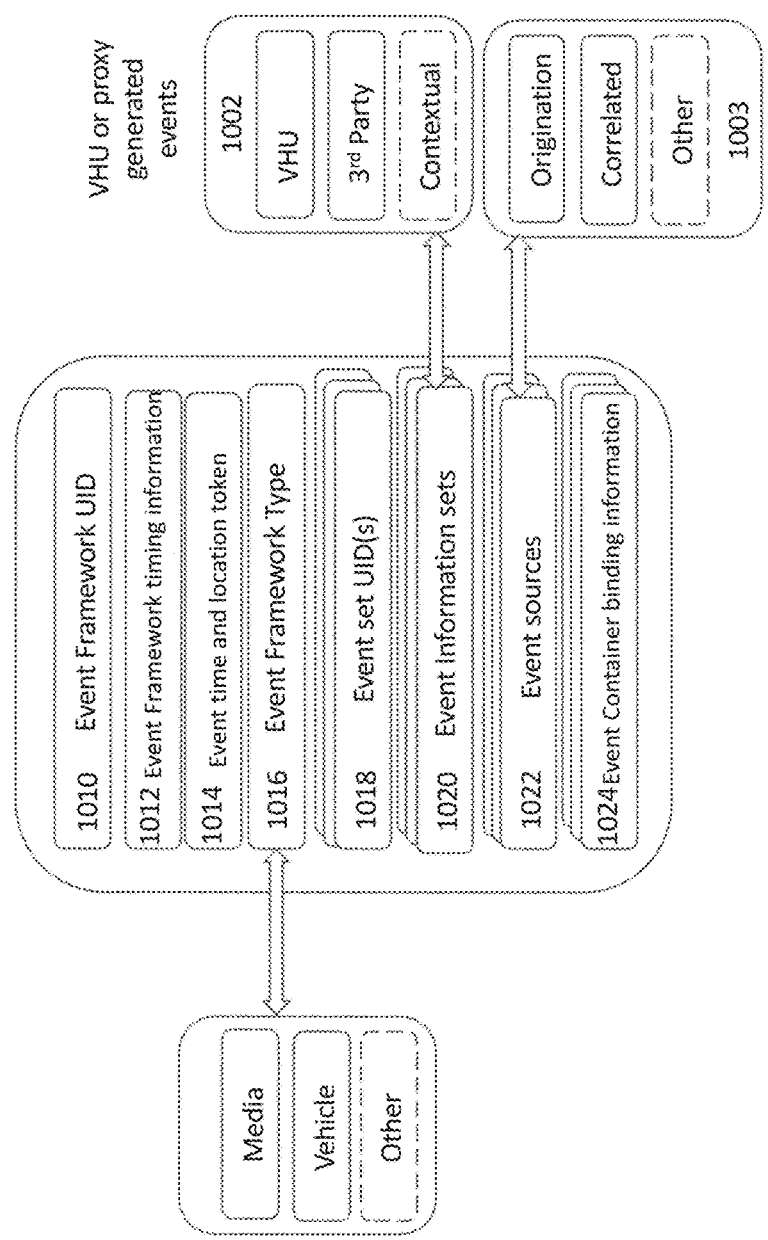
FIG. 10 shows one example of an event framework.

FIG. 9 illustrates an event container 901 that combines event frameworks that include media 902 and vehicle events 903, along with a reference time 904. Further media sources 920, for example radio program logs, stream logs or similar are then normalized 911, and where appropriate correlated 912 to an event framework that includes such media event. This may result in the creation of a further event framework 913 that includes the correlated media event. This event framework may then be included into an event container 914 that includes the media and vehicle events. In this manner such an event container may accumulate further media and vehicle events that are associated with the time span of the event container and may be used in subsequent processing, such as having associated causation or other metrics, being part of a report and the likes An event framework 1001 can include an organizational structure for events generated by at least one VHU and/or proxies thereof as illustrated in FIG. 10. In some embodiments, Event Frameworks (EF) 1001, are created when a new event is instantiated, by for example a VHU, 1002. An EF 1001 may include: the recording of an event information set by embedding or reference within an EF. Generally, this will be initiated when an event is generated by a VHU or proxy thereof 1014. Inclusion of at least one timestamp generated by VHU or proxy and/or by event framework instantiation processing 1012 can additionally be provided in the event framework 1001. Moreover, a token can be generated through the unique combination of time, location and vehicle identifier 1014 and included in the event framework. Further still, the system and method can instantiate a sufficiently unique UID 1010 including for example, authenticated identities of devices, occupants, vehicles (or parts thereof), VHU and the like. Such identities may be anonymized. The event framework can additionally include the type of event, for example media, vehicle or other 1014, event container binding information 1024, and sets of event UID for types of events, including media and vehicle 1018. The event framework can be hashed so as to create a unique immutable record of event which may include writing to an event repository 1024. Moreover, the event framework may be stored locally in VHU and/or in other storage mediums (including cloud/other device) in any arrangement. Such an event framework can be bound to an Event Container (EC). Such binding may occur at any time subsequent to EF being created subject to appropriate EC existing.

Event frameworks may include a single event or sets thereof, for example an event framework may be initiated when a user selection is made or a vehicle or media event occurs, for example when the VHU is turned on and the volume is set above zero and the audio mute is disengaged. An event framework can include a set of arbitrary events, for example an event framework may be stored at any granularity, based on configurations that may be implemented as software in a VHU or as processes applied to information sets provided by VHU or proxies thereof, including where these information sets have been aggregated.

In some embodiments, EF may be written to a repository, including distributed ledgers for example, a schema on read database, such as Mongo or Crouch, such that these EF may be organized and/or arranged as a further EF for reporting, analysis, evaluation and/or other processing.

As events are generated by one or more sources, for example a VHU or proxy thereof, these events, which in some embodiments may be configured as Event Frameworks, are aligned and bound with a reference time ledger. In some embodiments, such alignment and binding can be created through the use of Event Containers and/or digital fingerprints which are cryptographically bound representations to an immutable time ledger.

For example, as shown in FIG. 8, as each segment of the timeline is written to a time reference ledger 804, an Event Container (EC) is created with a UID 801 and is bound to that time reference ledger 805, representing a segment of time in such a ledger. Such a segment has a start and end time 830. Each of an EC may provide a structure for subsequent event inputs (for example media or vehicle). Each of the EC may be configured so as to have a relationship with one or more event frameworks 802. This relationship may be cryptographically signed so as to maintain the integrity and audit trail of the occurrence of an event and any information set comprising such an event.

As described herein, each event may be configured as part of an Event Framework, which includes at least one timestamp from the source of the event. This initial timestamp may be used to correlate an EF with at least one EC. This initial relationship of the source time stamp and reference time may have one or more attributes associated with it, including for example, accuracy, confidence, offset or other metrics. For example, if a particular source has a consistent offset compared to reference time, then this may be expressed as a metric. This metric may then be used in the alignment, correlation and/or matching of further event sources for that EF. For example, a broadcaster log can be correlated to VHU entry, for example through matching the event information sets and reconciling the time stamps for accuracy.

Matching processes may include keyword, audio or other fingerprint, CRC/Hash or other event attributes and the like. In some embodiments there may be multiple sources for a specific event, such as for example a radio station log and a time aligned stream (for example an internet stream of the radio content). In this example both the time and event matching may be undertaken on a probability basis where, for example the minimum error is determined in relation to the reference time.

Individual events may be matched to multiple sources, as many aggregated sets of events, for example those received from a source that is a proxy for a group of VHU. Such a source may use a granular time that is larger than that used in the time reference ledger and as such represents a time based stream of sampled events. In this example, other sources may be used to refine the time alignment of the events with the reference time ledger, and may include metrics expressing the degree of certainty of the time expressed in the EF and the certainty of the relationship of that EF to one or more EC. In some embodiments, an event framework may initially have a relationship with a specific event container and then once further processing has taken place, have that relationship revised for a different event container. Such changes may be recorded in a repository, and in some embodiments that repository may be in the form of a distributed ledger so as to provide an immutable record. In some embodiments, such information sets may be stored in a combination of distributed ledgers and other databases, for example where a representation, which may be cryptographically bound, of an information set may be stored in the distributed ledger and the information set may be stored in an applicable database. For example, a unique fingerprint of the information sets, such as a hash, may be stored in the distributed ledger and the information set from which the hash was created stored in a suitable database, for example MongoDB and the like.

Figure 11:
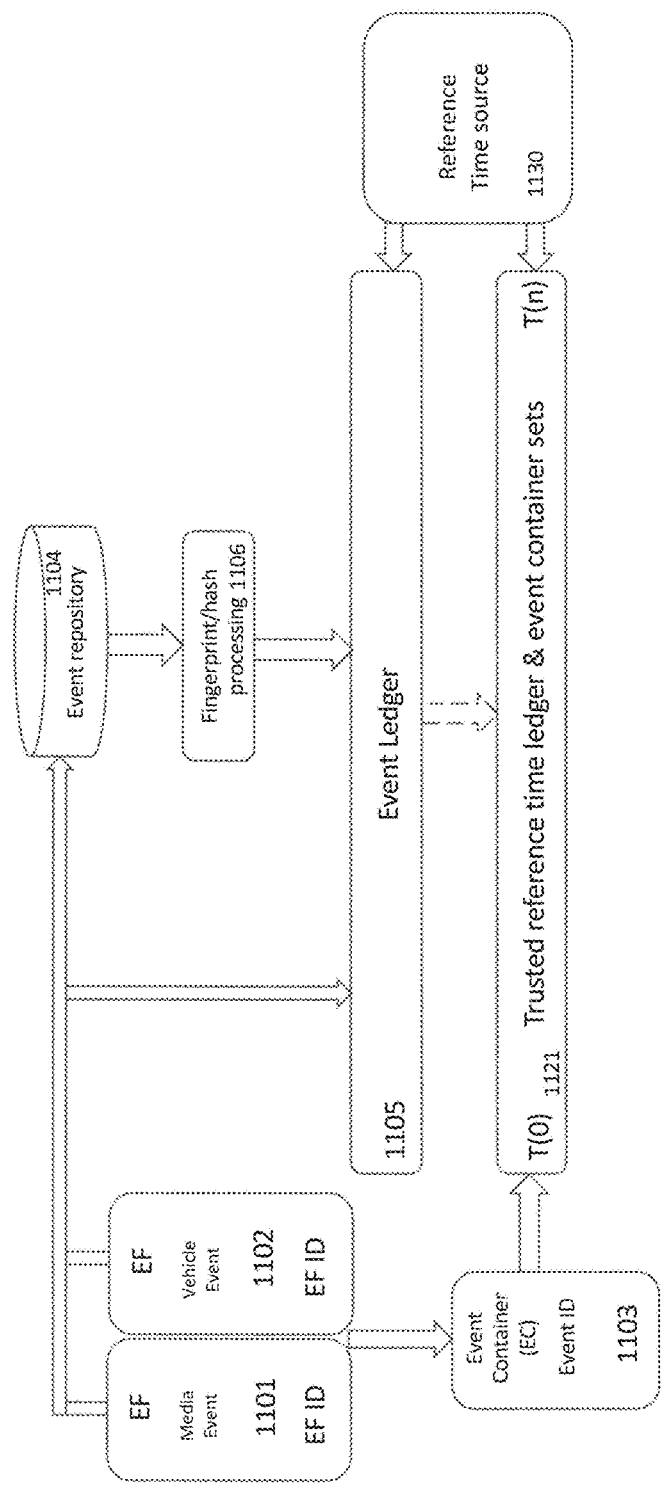
FIG. 11 shows one example of an event framework being bound to an event container, to an event ledger, and to an event repository.

Each event framework can be recorded in an event ledger, an event container and/or an event repository in any arrangement as illustrated in FIG. 11. Event frameworks for media and vehicle events 1101, 1102 can be bound to an event container 1103 and can be stored, in whole or in part, in an event repository 1104 and an event ledger 1105. In this manner, event frameworks 1101, 1102 may be bound to at least one time reference ledger 1121, whilst being stored in other appropriate repositories. For example, an event repository 1104 may include event frameworks 1102, 1103 in whole or in part and may have a fingerprinting/hashing function 1106 which can create a sufficiently unique identifier which is then included into an event ledger 1105, which can be a blockchain. In this way the bulk of event information is stored separately form the ledger yet retains the desirable immutable audit functionality of such a ledger. In some embodiments, an event ledger 1105 and a time reference ledger 1121 may share a common reference time source 1130. Further such ledgers 1105, 1121 may be bound cryptographically where appropriate. For example, where the event container includes at least one of a reference time or other normalized time span that an event, including sets thereof, an event framework and the events therein may be bound to an immutable repository, such as a blockchain.

An event framework may be connected, through for example a cryptographic binding, to multiple event containers, where the event container time span is less than the duration of the event, or set thereof, which the event framework includes.

Figure 12:
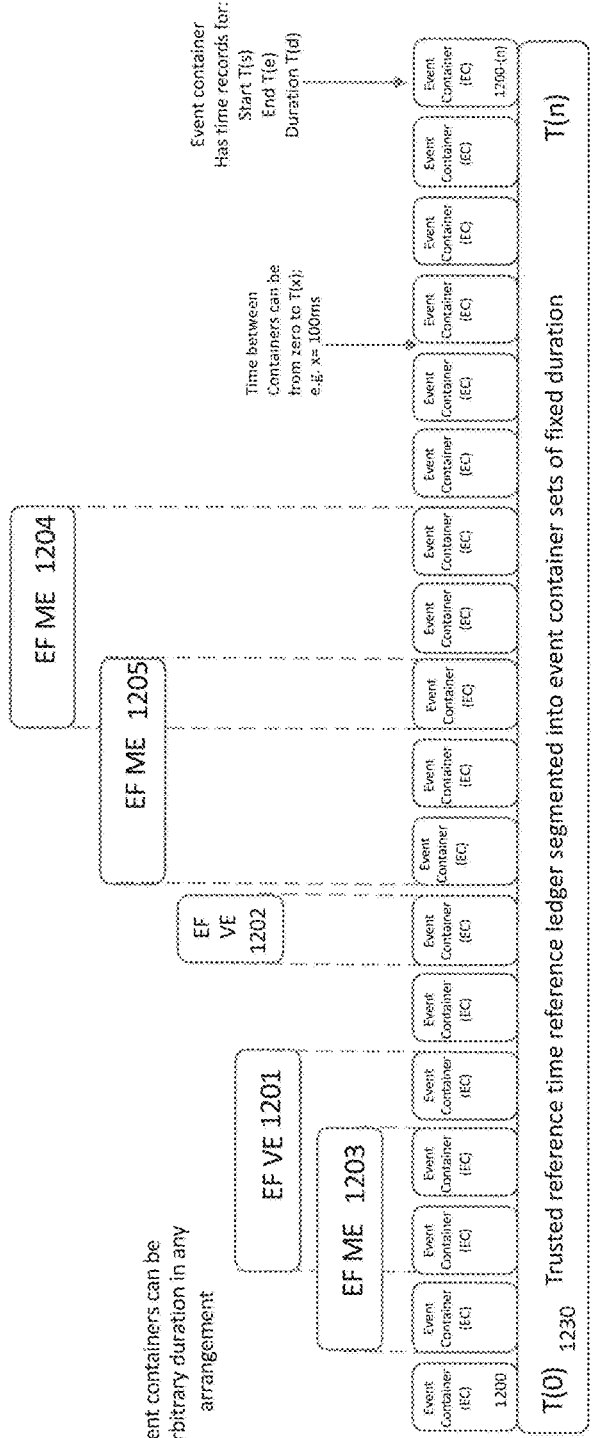
FIG. 12 shows an example of an event container and event frameworks alignment to a trusted timeline.

FIG. 12 illustrates an embodiment which combines differing event frameworks with different event types into a single event container that has the matching time span for the events therein. FIG. 12 illustrates differing event frameworks, for both vehicle 1201, 1202 and media 1203, 1204, 1205 events which can be correlated and bound to a set of event containers 1200-1200-(n) representing and bound to trusted time reference ledger 1230. Event containers 1200-1200(n) may of arbitrary duration in any arrangement. A reference time ledger may be bound to multiple event containers and sets thereof. This binding may include use of fingerprints, hashes and/or cryptographic techniques to ensure the binding supports auditable chains of control.

Event Configuration and Processing

Information sets generated as part of an event may be normalized so as to create an information repository with certain common characteristics. The process for this normalization may include transformations that include both direct, for example term matching, and indirect, for example using probabilistic techniques, methods. For example, if the incoming information sets are based on a time granularity that is longer than that of the underlying repository, for example that in a time reference ledger, the event may be allocated a time that is within the granularity of the time information and provided with a metric that is based on the estimated accuracy of the event. This may then be updated by furthermore accurate information, for example from a content broadcaster log, such that the accuracy of the time information is increased. The methods applied in such a process may bound to such a time event, by reference or embedding.

In some embodiments sets of such time information may be calculated based on sample correlations, for example if one or more event has accurate time information, for example from a log which is known to be accurate, from a set of events that are received form the same source, then an offset may be calculated and applied to all the events in that set. In some other embodiments, contextual information such as, location and/or weather may be used to correlate with vehicle operations, such as windshield wipers activation, car thermometer and the like, which may improve VHU events timestamp accuracy and consistency. This may create an offset that can be applied to a VHU during a specific period to improve overall time accuracy. The resulting offset, along with references to the contextual information can be recorded on the time reference ledger or other repository with binding to such time reference ledger in order to enable tracking and verification of data analysis and results.

The use of multiple event information sources may include the use of multiple methods for evaluating the correlation of the information sets. As an initial event is expressed in an event framework, this may be used as a basis for matching to other information sources, including content providers, for example radio station logs, streaming services and other reliable information sources. For example, this may include monitoring the meta data of an operating streaming service. In such case, for example, matching the timestamps from the streaming service content play logs with event attributes, such as selected media source and timestamp, will result in realization of the specific content that was consumed and the time it was consumed.

Returning to FIG. 7, each event source 701 may provide event data through different mechanisms, using different protocols, access methods and data formats. In order to obtain and use data from multiple sources, a specific connector/extract-transform-load component may need to exist for each event source 710. Other external data sources may also need connector/ETL components that handle their particular connection 714 and data transformation needs.

Events and their attributes may come in different forms from different event sources, depending on the event information collection method, hardware and software versions, policies, and the like. These events undergo normalization, via a module 710, converting them to a form that can be applied consistently to all the data processing and analysis steps, including a data processing pipeline 720. For example, an event source may report a change of radio station as a series of events representing multiple activations of the radio "Scan" button by the user and the final radio frequency selected. This sequence of events may be normalized as a single "VHU_STATION_CHANGE" event. Other event attributes may need to be converted to a common format (for example, timestamp may be converted from epoch to ISO 8601) or to common units (for example, speed and distance from miles to kilometers or audio volume level to a normalized 0-100 scale) or to a common reference system (for example, geographic location may need to be converted from the source geo-reference system to the WGS84 datum).

Event attributes can also be annotated or enhanced by correlating attributes with external data sets. For example, location with market geo-locations in order to assign specific market and time zone, radio band and frequency with radio station names per market or satellite channel number with satellite radio channel lists, in order to assign a specific broadcast media source to the event.

The events in the normalized and/or annotated format can then be stored in an event information sets repository 730. The time information for the event information sets can be recorded on a time reference time immutable distributed ledger 740 and their unique identifiers, as well as their personal identifiable information (PII) can be recorded on an identity distributed ledger 742 and on access-protected portions of the event information repository.

The sets of normalized and annotated events and the external data can then be used for processing, matching and analysis via module 720, which may include identification of experience sessions, such as start and end of listening sessions to a specific station, source or content piece (such as a song or a radio program), classification of the vehicle occupant based on location, vehicle make and model, experience behavior, etc. (or combinations of them), identification of behavioral patterns (movement, listening, driving and combinations of them), and generation of data aggregations 750 and measurements for sets of occupants by area, demographics, time and other data classification criteria.

The following example shows a set of listening experience sessions obtained from the example events presented before and formatted in JSON:

"listeningSessions":[{
    "sessionId": "D6911D8F18FE416EBD9C032E85227DB2",
    "anonymousCarId": "XY0677052M92", -continued

```
            "MSA": "Los Angeles",
            "startTimestamp": "2018-08-31T06:05:25Z",
            "endTimestamp": "2018-08-31T07:06:30Z",
            "attributes":{
              "source":"CD"
            }
        },
        {
            "sessionId": "98C57C48DE1C4CF4864B630FEFFE2D9C",
    "anonymousCarId": "XY0677052M92",
    "MSA": "Los Angeles",
    "startTimestamp": "2018-08-31T07:06:30Z",
    "endTimestamp": "2018-08-31T08:36:33Z",
    "attributes":{
      "source":"Tuner",
      "band":"FM",
      "station":"KPCC-FM"
    }
},
{
    "sessionId": "6CACDD02BEB84ECF9BE2427C9331F592",
    "anonymousCarId": "XY0677052M92",
    "MSA": "Los Angeles",
    "startTimestamp": "2018-08-31T08:36:33Z",
    "endTimestamp": "2018-08-31T09:07:30Z",
    "attributes":{
      "source":"Tuner",
      "band":"FM",
      "station":"KVCR-FM"
    }
```

Individual behaviors and behavioral patterns, as well as aggregated ones and their correlations with external data can be identified, classified, and stored, via a matching module 722, as learned data, historical reference data or individual user profile data 752, which can be used as external or contextual data sets for processing future events and/or as an output product of the one or more processes.

In some embodiments, events may be normalized to conform with one or more event format, such normalization may include the following operations:

Time stamp reconciliation: time stamp may be normalized to reference time ledger and may have other offsets applied when further event correlation information, such as for example other information sources for the same event. This may include those that are determined to represent the event through probability or other statistical techniques.

Event and/or event information sets extraction: this may include segmenting a file or other data repository into individual events representing a sequence of events related to a time line. A system may also be configured to identify and extract specific information from either the repository or a sets of events, some of which may be part of such repository.

Event correlation: this may include analysis of an event information set and selection of at least one element for comparison and correlations with other events.

Event quantization: A specific time period, such as that typically used in an advertisement break in a program, may be used to quantize a set of events so as to configure these for other operations, such as report generation, pattern matching and the like.

Certainty: A set of metrics may be applied to an event or part thereof to identify the degree to which the event information is accurate. This may include the identification of the methods employed to evaluate such metrics.

The collection and collation of events bound to one or more time references, provides a basis for detailed evaluation and expression in the form of one or more metrics. Some of the metrics are currently in use within the media industry; however, the accuracy and validity of these has to date been largely based on statistical sampling with little correlation and a variable time reference of limited accuracy.

The instant system and method improve upon prior usage of metrics with the reliance on an accurate bound time reference that is recorded as a blockchain, with each event set being referenced to that time line and comprising, for example, multiple correlated event instances. The accuracy and authenticity of the events, as such, becomes reliable and trustworthy to the degree that behavioral metrics and other pattern based evaluations become relevant and meaningful. Metrics may be considered in a number of categories; however, the reliable immutable underlying event and time information may support any combination in any arrangement, the following of which are indicative examples.

Event metrics may be configured to match common representations used by content providers and/or advertisers. For example, metrics presented to advertisers may include:
1) Exposure
2) Conversion
3) Attribution Such metrics can be tied to a reference time ledger, providing proof of performance of the material. In the case of content, for example radio programming, music or other content, the events metrics may include for example:
Time of content start;
Time of content stop (through either change of content or listening volume set to zero or muted);
Changes in volume (and any peripheral events, such as incoming phone calls); and
Tagging or marking of any content.

All of above metrics can be tied to a time reference ledger, providing an accurate immutable time at which such events occurred. These events may be aggregated as sets for a specific piece of content, for example a particular song may have a number of such events aggregated across multiple users, and as such provide a detailed perspective on user behavior for that song, for example, many people increase the volume at the chorus, or how many people change channel or lower volume at the verse or similar.

The creation of such event metrics where multiple sources of information are correlated and bound to a time reference ledger provides an accurate and immutable record of user behaviors. Further event metrics may be created through the use of techniques, such as for example:
inference;
calculation;
pattern recognition (Patterns and Anti-Patterns);
probability; or
the like.

In a number of embodiments, machine learning methods may be applied to sets of events, and the information there in, for example to create probability distributions for events, in whole or in part, or the likelihood thereof. This may include such techniques as clustering, classification, regression and role extraction in any arrangement.

The combination of accurate time and event granularity provides unique opportunities for predictive metrics. For example, the event information sets that are received from a broadcast station program list, may be used to evaluate the information sets received from a VHU to establish correlation of the time and content elements of the information sets and determine the probability distribution most relevant to the information set under evaluation. The correlation between the time granularity used by the VHU, or provided by a proxy thereof, and that provided by the program listing may use matrix factorization to establish clustering and classification outcomes.

In some embodiments these metrics may include one or more reference(s) to method(s) used in their creation. These may be presented as information sets that may be further processed by systems designed to create additional metrics, reports or similar. The methods deployed and their application to specific information sets may be recorded in an appropriate distributed ledger. This may include the use of a repository for such methods, which is cryptographically linked to a distributed ledger, for example where a hash of the method, the time, the results of the method and the target of the method is stored in the distributed ledger. In some embodiments, these elements may be processed in a secure environment, such that the processes undertaken and the outcomes thereof are encrypted. This may involve the use of a secure key management repository which may be connected to a distributed ledger, for example to store a hash of the key or the key itself. In this example, the secure repository may hold the encryption key with a key management system providing the capabilities to manage and enforce permissions for those keys. The distributed ledger may record a hash of the key, and potentially other information held in the connected repository as an immutable record. This information, subject to appropriate permissions may be used to validate the metrics and methods employed in support of the content monitoring and measurement, for example by multiple content providers, including advertisers and the like.

This approach provides provenance of "insights" that may be created through such an analysis where for example, each outcome can be traced back to a specific set of information, expressed as, for example, an event framework bound to a time reference ledger, that immutably represents the event occurring, and the methods employed in the creation of any metrics associated with the event.

One advantage of such an approach is the ability to create patterns based on real time events with accurate, reliable and verifiable timing information. The underlying event and time information sets are bound to the immutable one or more reference time ledgers 202, 203, 204, as shown in FIG. 2, to provide a basis to create metric sets that support, verify and quantify both exposure and causation of actions, at least in part, resulting from such exposure.

Some embodiments may employ spatiotemporal databases as repositories for such information sets. This database may be connected to one or more distributed ledgers, including time and location reference ledgers that provide an immutable record of events stored in such databases. In this manner, a verifiable record of when and where exposure to content occurred may be used to evaluate vehicle or occupant behaviors in response to those exposures.

Behaviors may be, in some embodiments, characterized as journeys, sessions and patterns. For example, a journey may comprise an initialization sequence, location variations and a completion sequence all of which are correlated to a time reference ledger. Such a journey, which may be represented as a set which includes the following events:

journey start;
journey location waypoints;
journey completion; and/or
journey regularity.

The segmentation and granularity of a set of events comprising such a journey may in-part depend on uniqueness of journey, for example, if a journey location way points are unrecognized from previous journeys then granularity is high, for example each street change, whereas if journey locations are recognized then journey granularity may be reduced to a minimal information set, such as each waypoint. This granularity may be undertaken with both time segmentation and/or location segmentation. Journeys may include sets of nodes, e.g. waypoints. An observed node or waypoint may be associated with an unobserved waypoint, such that patterns may be determined where minor variations in a journey are reduced in importance or not considered, unless they are associated with a point of interest (POI), such as a retail location or similar. Techniques such as affinity graphs may be used for this purpose. Such graphs may then be configured to create representations that are correlated to content consumed within the time segment to identify behaviors associated with that content.

The journey events may be determined from the vehicle events that are captured in, for example an event framework bound to, at least one, reference time ledger. As journeys are completed, patterns of behavior can emerge. For example, taking children to school or undertaking a commute to work and as such, when deviations from these journey norms occur this may create an exception which may trigger greater granularity of information capture or other actions.

For example, vehicle location information may be determined through the evaluation of the start timing and initial location and the end timing (for example when the vehicle is turned off), where the intermediate locations are unknown, based on a geographical map of the area traversed, the relative timing of such a journey, providing a probability analysis of the route most likely taken. For example, tensors may be used to represent the relationships between time, road segments and vehicles, in the form of a three dimensional tensor. Further, for each content broadcast in a location at a time, another tensor may be built that represents the average response to that content at that time for that location. This supports the evaluation of event streams received from vehicles to determine their relationship to this average tensor. For example, if there is an anticipated response to a specific content element, for example based on the number of exposures, a deviation from this may trigger an exception, requiring a more detailed review of an event stream. For example, an event information set can include or be correlated to a navigational information provided by a VHU, or vehicle system, or a device that is in the vehicle capable of producing such information, such as a cell phone, where that information can be recorded as part of the event set, this can be used to further identify the route of a vehicle.

Sessions may include sets of events that represent a user's interactions with vehicle media and/or communications systems, such as those involved in, listening, viewing, interacting, transacting, including a VHU. For example, this may include sources such as in car entertainment, communications, and other devices co-located in the vehicle at the time of the session. A session, for example, may have a start and end times, which are recorded in, at least one, reference time ledger.

In one exemplary method, the representation of session information sets can make use of acyclic graphs, where each event is a node on a reference time line. In some embodiments, this time line may be related to the session and may be adjusted to comply with a reference time ledger which is tied to the systems reference time source. In this manner a time that is the source of truth can be configured.

Some of the event information that may comprise a session can include, for example:
the sources of the media;
the durations of the event;

the volume or other audio control functions;
any "edge" points where a user interaction occurs (e.g. Volume up/down; channel change; phone interrupt etc.); and/or
the like.

The recording and storage of events and their timing in an immutable repository can provide a source of truth that may be relied upon. Such a repository may be used for multiple sets of metrics that may be created through the use of one or more probabilistic techniques, including those of machine learning, deep learning and the like. In some embodiments, these metrics may include, identification, aggregation, correlation, causation, classification and the like.

Metrics based on probability analysis, including probability domains, may include:
causal relationship metrics;
journey deviation metrics;
experience variance metrics;
accumulation metrics;
exception likelihood metrics; and
the like.

Each of the aforementioned metrics may be created through analysis of media and vehicle events, based on a common reference time ledger to ascertain the relative relationships and their correlation to the patterns of behavior that have been determined over the course of a statistically significant set of previous events.

In some embodiments, the use of multiple granularities of time, a vehicle or the VHU may provide time accuracy in seconds for an event, whereas a pattern of events, locations and content may become apparent across a time period of weeks or longer. Such an information set may be evaluated using Recurrent Neural Networks (RNN), for example with the LSTM (Long Short Term memory) approach. Further techniques such as gated RNN's may be used, so as to separate the activities that resulted from exposure to content from the occasions where there was no such activity, within the context of an accumulation model recognizing each occurrence of the content.

The extraction of rules from data sets can involve establishing the conditional probability of the time period, content identification, location (including relationships to POI that are associated with, or have a significant relationship with, the content), routes that in combination form journeys to such locations and associated identities. This may be used to establish rule sets that are applied to any of these entities in any combination. These entities can become the discriminating features for the data sets being evaluated.

As the information sets that are operated upon may come from different sources over a period of time, a range of accuracy validations may be applied, such as mean absolute error, mean squared error, true and false positives, as well as traditional precision and recall metrics. Theses range of accuracy validations may all form part of the coefficients of variation that may be applied to the clusters that are analyzed by the system.

The application of reinforcement learning techniques based on state-action pairs may also be applied when a state has been recognized, for example a regular route and associated behavior patterns established, for those situations where an action that diverges from this pattern may be used to create a model with the appropriate rewards, that can be applied to further large data sets. This includes creation of tensor or other representations of information sets that may be encoded or be derived from state-action pairs or other discriminating features in any combination. This provides a high degree of flexibility in analytic composition, though combinations of features, to aid in determining the behaviors of content providers and content consumers within the context of a vehicle.

Within the determination of state, the use of location segmentation may be applied, including treating a regular route a vehicle takes as a location segment. This can effectively reduce the number of data points to be considered in any evaluations, providing a "clipping" function so as to avoid parameter gradients. The activity within such a location segment may be the hidden layer.

Identification

As noted above, in some embodiments the details of an individual occupant or a specific vehicle may be masked or obscured so as to prevent direct identification of either of these. Some information sets may be aggregated such that the event and vehicle information sets represent groups or classes of vehicle and/or occupants. In some embodiments, there may be sufficient information available to ascertain a sufficiently unique identifier for a set of vehicle and/or media events whilst still preventing the accurate identification of the actual occupant or specific vehicle, meeting personal identification information (PII) obligations where appropriate. There may also be situations where an occupant opts in to provide a sufficiently unique identifier for themselves and/or their vehicle.

The system may be based on sufficiently unique identifiers so that each set of media and/or vehicle events may be bound to such an identity with an associated measure of certainty so as to create patterns of behavior that may be used for further evaluation and processing, including correlation and causation analytics. Such identities may be stored in a distributed ledger, databases or other repositories in any arrangement.

In some embodiments, a unique identification (UID) may be incorporated into a device, such as a VHU, vehicle systems and or other device, such that these UID may be verified as authentic presentations of such devices, for example through reference to a trusted repository of these identities. In this manner the source of events may be authenticated to specific devices, including groups thereof, through in some embodiments such identity may be obscured in manner that makes it computationally impossible to identify personal identifiable information of the device and any associated users.

Some of the event information sources may include event information sets that are partial in nature. For example, a file of event information may have been corrupted or disrupted such that the events themselves are incomplete, such as only having a single time stamp, which is not identified as start or end, having little or no other event information sets or comprising multiple events that have been merged without any indication of that occurring. In this case these events are considered as partial events and may be identified as such and consequently the processing for normalization and integration with the rest of the systems information systems may differ. This may include using techniques associated with sparse data analytics and other suitable techniques so as to, as far as is practical rebuild these event information sets into as complete as possible versions. This may include correlation with other event sources with sufficient common elements, using for example, probability distribution techniques, and other matching, based for example of time, keywords, content or other fingerprints and the like.

These partial event information sets may be identified as such, as may metrics bound to them indicating this state and the potentially referring to the methods employed to recreate or rebuild the information sets of those events.

Patterns may comprise sets of individual events, including media and/or vehicle, and the information sets thereof correlated to a reference time ledger. Patterns may be determined for journeys, sessions, experiences, locations, content and other system elements in any arrangement. Each of these patterns may be represented by a number of differing implementations, including but not limited to acyclic graphs, or other graph based representations, lattices, multi-dimensional spaces, manifolds and/or other information management and repository embodiments.

A pattern may include any set of information, where the relationships between each information element in such a pattern are declared or derived. Frameworks for patterns may be employed to organize such information sets, for example a pattern for a journey may include for example:

the journey start—VHU provided information of vehicle start and movement initiation;

waypoints—sets of locations that a vehicle may transit as part of a journey; and/or journey end—VHU provided information at the conclusion including vehicle stop.

For example, such a pattern may be a road map sequence representing a journey with associated time information for each portion of such a journey. A waypoint may comprise a location or point of interest (POI) that a vehicle passes and may also include timing information regarding that vehicles transit of such location, including whether the vehicle stops for an extended period, that is a period longer than that associated with a traffic light, stop sign or other road marking or for example if a vehicle is at a POI which is a school or drive through facility. For example, a morning commute may include dropping children at a school or transit location. Waypoints may also be configured to include situations, such refueling a vehicle where the engine is switched off, though the media systems are still operational and an occupant may have left the vehicle. This level of granularity of media monitoring improves the reach and understanding of occupant behavior.

Patterns may include vehicle and media events and combinations thereof. For example, there may be a repeated journey, such as a commute, which forms a pattern based on this journey to which media experiences may be added to create a behavioral pattern for the occupants of that vehicle. Pattern determination can be focused on individual listeners/drivers and/or on groups, where grouping criteria can be based, for example on market area, type of vehicle, demographic classification such as age group, and the like.

In some embodiments, repeated patterns (such as common sequences of vehicle events, media events and other behavior indicators) may be identified, and for example classified. These common patterns can be correlated with contextual information, such as weather, traffic, time, calendar events and so on.

Repeated patterns can be of intrinsic value and may also be used as a baseline for identifying unique variations, such as cases when common patterns are expected but are not occurring. In such cases processes may be initiated to correlate these exceptions with other events and contextual information, such that a causation analysis can be performed in order to identify triggers, such as weather variations, exceptional traffic, fires or other disruptions or causes the variations in these patterns.

For example, a sequence of locations that frequently match a route on the city street map during a specific time range every week day can be identified as a common commute route for an individual vehicle, which may be expressed as a journey. A specific audio or other source may be matched with the commute route pattern, adding to the "commute behavior" pattern for the vehicle occupant(s). Cases when the common route or the common audio source don't match the commute behavior pattern can be identified and analyzed, correlating, for example, with traffic information, weather, local events. This can result, for example, in finding common route deviations that tend to occur on rainy days.

As a journey unfolds, a VHU or proxy thereof may provide event streams, comprising both vehicle events and media events, forming sessions. These streams provide sequences of events that when correlated to the journey, in terms of locations, vehicle operations and time, provide a unique insight into the behaviors of the vehicle occupants. These may form patterns that through repeated behavior, provide insights into the relationship of the occupants to the media, within the context of the journey.

Aggregation

Aggregations of these information sets may include establishing the feature sets that are pertinent to both the use of such techniques as machine learning as well as those feature sets used by content providers and distributors. Establishing patterns of types and distribution of content, locations and their relationships to vehicles, occupants and their selected experiences and vehicle characteristics, all related to an accurate time and immutable record of these undertakings creates a unique capability to establish effective metrics reflecting insights that are valuable to all the stakeholders involved.

Aggregations may include, for example, counts, such as number of unique media consumers, number of consumption session starts, and number of vehicles with active sessions. The aggregations may also, or alternatively, include calculated values such as average consumption session length. These aggregated values may be calculated and grouped for every media source, for every program, content piece or advertising piece, for every specific period of time, such as quarter hours, for every market area and for every demographic, among other grouping criteria.

One possible direct application of these aggregates is in the form of data visualization dashboards that stakeholders can use to select groups and filters, such as time periods, locations or markets and sources, in order to obtain insights, in graphic or tabular form, that are of value for their specific interests. Some examples include vehicle OEMs who want to identify media sources most used by their customers, grouped by vehicle make and model, or media content providers who want to measure the effects of content changes in their audiences, or advertisers who want to identify the time periods, media sources and markets where their ads will be most effective.

Correlation

Correlation may be used to identify and evaluate typical and atypical events through comparison of journey information and experience or session information, resulting in part from vehicle event streams and media event streams. One aspect of this is the calculation of the time differentials from one or more exposures to media content, differences in such content, including personalization, localization or other targeted content variations, and changes in the patterns of behaviors of vehicles and their occupants.

The evaluation of event information to establish correlations, using time, location, vehicle characteristics, user experience variations, contextual information and other sources may be undertaken through configuring one or more machine learning techniques, including for example those employing probability distributions. In some embodiments, these techniques may include the use of Hilbert spaces and/or other multi-dimensional spaces to align events, their context and their accurate timing.

Causation

A key aspect of the system is establishing the relationship between the content occupants of a vehicle experience and the impact of that experience on their behavior. As the system may comprehensively monitor the experiences of occupants in vehicles and their typical patterns of behavior, the potential is created to establish relationships between these experiences and occupant's behavior.

These relationships can encompass not only the vehicle occupant's responses to, for example, advertisements in broadcast material, such as radio, but also their adjustments to the VHU entertainment controls, for example raising or lowering the volume on a specific musical piece or type of music.

The information generated by these actions, especially when such actions are atypical in relation to established patterns of behavior, provide a basis for establishing causation between a media event and a vehicle event. For example, if an occupant directs a vehicle to a recently advertised location, for example one offering a significant discount to a product and that direction is atypical in relation to the typical pattern of behavior of that occupant at that time in that vehicle, then a causation metric may be set, for example using an exception to undertake a process of evaluating the event information and pattern information to determine a causation metric. This may then be represented in one or more reports and/or may trigger other evaluations and/or processes.

The use of vehicle event patterns and media event patterns to express behavioral characteristics, when combined, provide patterns for journeys which may be used as a basis for determining atypical behaviors and corresponding causal relationships. Once a causal relationship is established, which may be done in real time or near real time, this may be used as a trigger for other events or actions, such as the creation and presentation of offers to vehicles occupants prior to their arrival at, or at their destination, for example when they have deviated from their typical route to take advantage from an advertised offer.

Such offers may also, subject to a user opting in to do so, be delivered to a device that the occupant controls or has access to, such as a communications device, VHU, Internet of Thing (IOT) device or other device capable of receiving such an offer. For example, a barcode or similar may be sent to an occupant's smart phone in response to their causal metrics exceeding a threshold and the vehicle events confirming their change in route to a destination associated with the offer.

The matching between events and contextual information (weather, school schedules, portions of the day—such as morning drive—, traffic, local event calendar, etc.), used in the different pattern identification and classification methods, is based on location and time. Since the time references, time matching among events and between events and contextual information, and the time corrections are all stored in an immutable distributed ledger (such as a blockchain), the patterns and classifications can be backtracked, verified and validated, which adds trust and certifiability to the process' end results.

Classifiers

Figure 15:
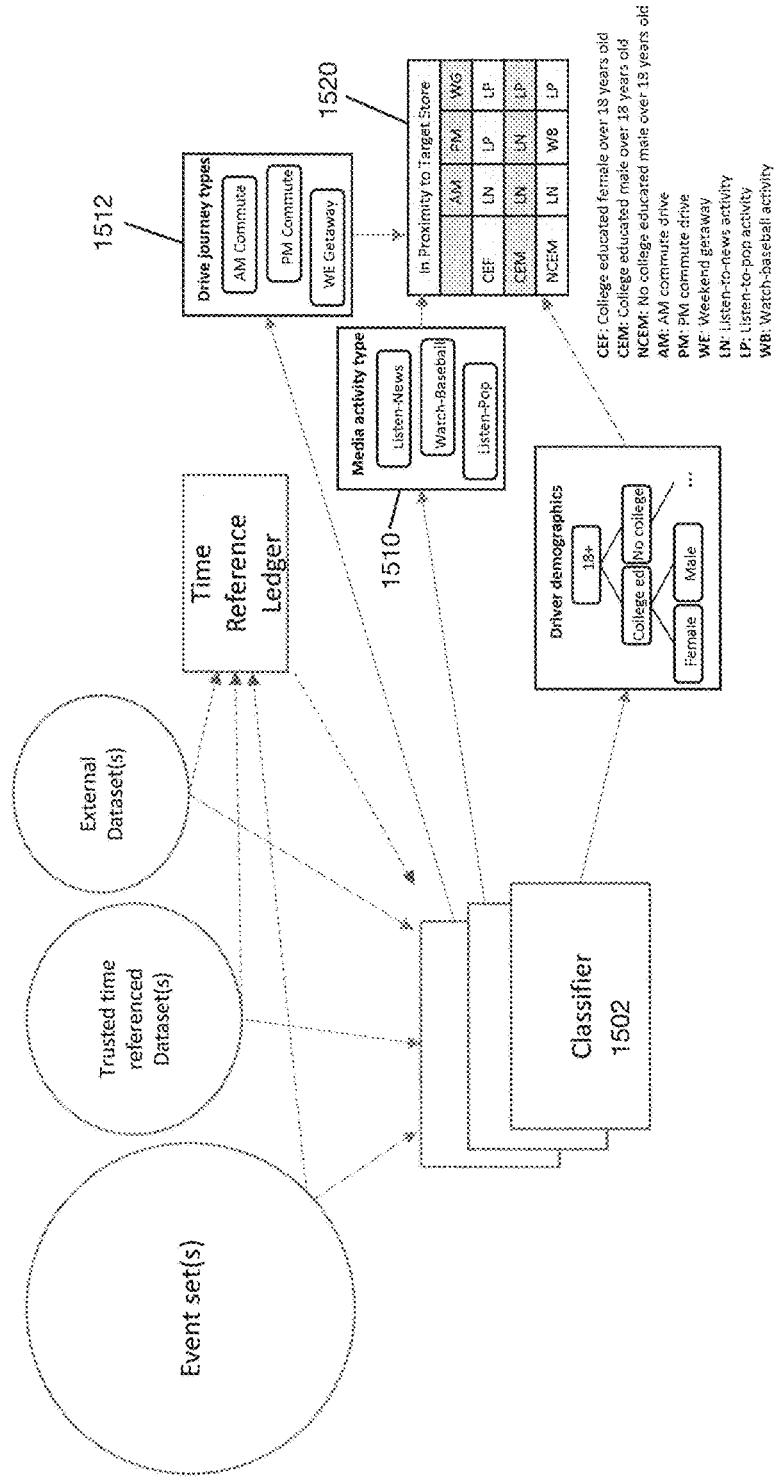
FIG. 15 is a diagram of an embodiment of the data analytics processing system.

In some embodiments, the system may include a classification system 1502, as shown generally in FIG. 15, which in some embodiments may be deployed as ontologies and/or taxonomies. These may be used for the evaluation and processing of information sets of both media events 1510 and vehicle events, and parts thereof. Classifiers may be used to categorize journey types 1512 and patterns of behavior 1520 so as to support evaluation of the large scale information sets generated in the course, for example, of the morning or evening commute of a major city.

One form of classifier 1502 may be based on patterns that are determined through evaluation of media and vehicle events that are immutably bound, directly or indirectly to at least one reference time ledger. For example, this may include classifying journeys intro classes such as; morning commute, evening commute, shopping, family visit, sport, and other common journeys, shown in block 1512. There may be further segmentation into sub-classes by time of day, week or month and the like. Some embodiments may include matrix relationships 1520 based around journeys, time and events.

As illustrated in FIG. 15, properties from event set(s) (such as vehicle ID, time, location and activity) can be matched with the properties from external datasets (such as content programming lists, demographics based on market, media consumption and vehicle ownership, weather, holiday calendar, traffic, etc.). This matching can be based on time and/or location with different levels of granularity. Algorithmic or derived classifiers 1502 (such as neural networks) can be used to produce detailed classifications of, for example, demographics, media activities, and drive journeys.

Relationships between classes can also be established based on location, time and other attributes. For example, media activities can be associated with demographic types and drive journey types around a location of interest, such as a store, which can be used by the store business to make informed marketing plans and ad purchase decisions, shown as matrix 1520. In the illustrated example, a matrix is formed based upon driver demographics, e.g. college educated female, college educated male, non-college educated male, etc., the journey types, e.g. morning or evening commute, or a weekend getaway, and the particular media activity types, e.g. listening to one of news, pop music, or sports, as a function of proximity to a particular targeted store.

Classifiers may have multiple dimensions based on patterns, such as for example, including elements such as time, journey, session and identities, where each of these may form part of an array which forms the classifier. The classification may be fuzzy in that not all of these elements are present, or the attributes of an element includes probability metrics, that although they are within a defined distribution, for example within a percentage deviation, provide insufficient certainty for that element. Classifiers may also include elements and sequence information, where the sequence of events may determine the classification of certain journey types.

For example, a point of sale (POS), e.g. a retailer, for a product that is being advertised, may be used to classify those journeys that pass within a specified radius of that POS, where the time and location of exposure to the that advertisement is recorded. This information may also inform a content provider when an advertisement should be delivered, such that the impact in relation to the location is maximized.

The foregoing includes classifiers that are determined by metrics that are commonly used by advertisers, broadcasters, content providers and others as well as those classifiers created through analysis of the information sets in aggregate through such techniques as machine learning, deep learning, spatiotemporal data analytics and the like.

Information Integration

In one embodiment, an aspect of the system can be the collation and management of sources of information into a cogent and accurate representation of events and their occurrence in relation to a reference time recorded in an immutable manner, such as with a blockchain.

FIG. 7 illustrates one exemplary embodiment, the elements of which are described below.

The illustrated system elements, of FIG. 7 for example, perform the functions and processes for extracting, transforming and/or configuring input source events to a normalized format suitable for subsequent processing. Such functions may include synthesizing information sets, and retaining identification thereof, where the event information is incomplete or sparse, for example where the event data is presented in sample form. As shown in FIG. 7, each of the connector/ETLs 711, 712, 714 is configured for a type of event input, where the input event information set may differ from connector to connector. As the output of each connector/ETL 711-713 can be consistent to the format of the event framework (EF), there may be an additional process which can evaluate the incoming event sources to configure each Connector/ETL 711-713. This processing may be undertaken prior to or at the time of connection and may involve one or more processing steps performed by an in-vehicle head unit 701.

In some embodiments, one or more Identity Ledgers ("ID Ledgers") 742 can provide a repository for sets of personal identifiable information (PII) of individuals and vehicles which is stored in an immutable, encrypted form using a distributed ledger, such as a blockchain. The unique identifier (usually a cryptographic hash) of every entry in the ID ledger can be used to anonymously reference the individual or vehicle along data processing pipeline. The PII information within the ID ledger entries can be partitioned and encrypted in order to provide controlled multi-level access of such information to different actors.

This may include for example PII for each of an occupant within a vehicle, where such information set is available. In some embodiments, there may an encrypted repository that stores PII, which is external to the blockchain, though it is cryptographically bound to that blockchain. In one example embodiment, the blockchain may be store the public key of the external to the blockchain encrypted repository of PII, such that this information may be verified through use of this public key. The combination of blockchain and external encrypted repository may be in any arrangement, including of the relevant keys for such encryption.

In some embodiments, each event container (EC) 740, as shown in FIG. 7, or a unique fingerprint thereof, can be associated to specific time segment in a reference time line based on at least one timestamp included in such EC 740. This relationship can be stored in an immutable distributed ledger, such as a blockchain. A reference to this event/event container/time slot tuple may be used within one or more analytics processes modules 720, which enables functions such as verification, validation and/or tracing or backtracking of measurements and/or analytics results sets.

The reference time line can be implemented as a distributed ledger, such as a blockchain as shown in FIG. 12, where each block or record stored within represents a time segment or a timeslot in the trusted reference time ledger 1230. As a result, every timeslot in the time line 1230 can have a unique reference (cryptographic hash) which cannot be modified. This unique timeslot reference can then be used to associate it with any EC with timestamp that matches the timeslot 1200-1200-($n$). This association may be stored in one or more distributed ledgers.

Reference time ledgers may also be used to store time information for processing and analytics, ingestion of external data sources, aggregations and integrations and other system functionalities.

Event Information Sets Repository

An event repository comprises sets of normalized events, which are the outputs of one or more connector/ETL 711-713, FIG. 7, coming from multiple event sources that are stored, along with their respective references in at least one ID ledger and at least one reference time ledger, in one or more event data repositories 730. Such repositories 730 may be subsequently updated with further event information from external data sources 760, where for example processing and analytics has sufficiently established that such information sets correlates to the such stored event information sets. This correlation may include probability analysis, which for example may be represented as a confidence metric for such information. In some embodiments, such stored event records can be used for subsequent processing, data matching, analytics and/or aggregation processes.

There may be multiple external data sources 760 that are coupled to the system so as to provide and support accurate event information sets, including timing of such events and can be stored in an external data source repository 724. In some embodiments this may include three types of external data sources 762, 763, 764.

In some embodiments, one of the external data sources 760 can include a reference data sources 762, which itself may include: geographic and other location data, for example, GPS or similar, ZIP codes, city, suburb, metro area, political or other governmental areas and boundaries, utility designated areas, state or industry specific market statistical area and the like; and/or broadcast information including, Radio and or TV band and frequency information, satellite radio channel identifiers, wi-fi or other communication channel information and the like.

In some embodiments, the external data sources 760 can include third party data sources 763 can include any number of additional data resources, including: landmarks, points of interest, business locations, map, road networks, police, fire or other utilities, commercial and other locations and/or specifically identified locations that may be of interest, for example a specific advertiser location or set thereof. Other data sources may include, for example, demographics, based, for example, on location/market, vehicle type and/or listening patterns and may further include other contextual information sets such as weather/traffic patterns/holidays/local events/news and the like.

In some embodiments, the external data sources 760 can include sets of event centric data sources 764 including information that are supplemental to and/or validation of one or more sets of events, for example radio station logs/streamed internet radio and other proof or performance information sets, including sampling and evaluation of such samples, for example using fingerprinting or other recognition technologies, Advertising play plans and logs and the like. In the case where the individual is identified sufficiently, such information sets may include event information sets generated through their use of rental cars, ride share services, autonomous vehicles or other temporary transport they may use.

An events' geographic location can be matched with a market areas geographic boundaries in order to assign a market area to every event by way of a processing, matching and analysis. For example, a market area may be a characteristic of an event or set thereof. Market areas may be those used currently by broadcasters to define their addressable market segment and/or may be those defined by usage patterns of vehicle occupants as they undertake their journeys. These matched characteristics can be undertaken with multiple levels of granularity for each market area (for example, country, state, metro area, city, postal code, industry-specific statistical area and/or usage defined area).

For example, when active media source is radio, an event's band, frequency and associated market area information can be matched with radio station data in order to obtain a specific station identification (callsign) and other station data such as format, programming and play logs. This information may include various time stamps which may then be aligned with the time reference ledger and in some embodiments may provide further event information for an event. Such informing information may be used to validate or further increase confidence that an event generated by a VHU or proxy was an accurate representation of the occurrence of such event and that the occupant of the vehicle in which VHU was situated were exposed to and experienced such an event.

The matching of geographic information sets to event sets, by way of the processing, matching, & analytics module 720 may include, for example:

Events' geographic location being matched with road network data, landmarks and/or point of interest data in order to provide in whole or in part context for analysis of travel and behavioral patterns.

Events' geographic location and time information being matched with location and time dependent contextual data, such as local events, weather and traffic and the like.

Locations from consecutive and/or sequential events belonging to the same vehicle being matched with one or more location sequences from other sources, such as cellphone location logs, so as to extend and expand scope and/or depth of movement pattern analysis.

This approach supports further matching with demographics and other location-specific data to be undertaken. For example, an events' vehicle model, make, year, vehicle type and other vehicle characteristics can be matched with demographic data sets in order to associate the events with likely demographic profiles. The event centric data sources 764, where such information may be ingested through an appropriate connector 714 and stored in a repository 740, which may then be queried by a matching system 722 forming part of the processing, matching and/or analytics module 720. In some embodiments this may involve one or more machine learning types of techniques and/or other probability based techniques to establish one or more metrics for expressing the confidence, certainty, accuracy, timeliness or other attributes of this relationship.

Aggregations and Integrations

Establishing patterns in the information sets stored in a distributed ledger 107, as shown in FIG. 1, can be undertaken by sets of processes in a data analytics pipeline 105 which when configured appropriately produces outcomes, such as aggregations, measurements and insights which can be stored in a repository 106.

The data analytics pipeline 105 may comprise a set of machine learning and similar analysis tools, organization tools and systemizations and probability domain based tools. Each set of these tools may be configured to operate independently, in an arrangement, for example, sequentially or in parallel, and/or recursively in any arrangement.

Machine learning tools may include, for example, supervised and unsupervised learning techniques and variations thereof, with those tools most suited to pattern recognition of temporally based events taking precedence. For example, the use of kernel Hilbert spaces and Riemann manifolds, and other topological approaches, may be deployed to establish and create suitable ontologies and taxonomies for pattern definition and information organization. Such an approach can benefit from an enhanced mechanism to determine the relative quality of sets of probability domain information that are temporally connected, though not necessarily is a sequential or continuous manner. This may also include evaluations prioritizing movement and location, for multiple time periods, and may involve the use of Cartesian, fuzzy and lattice approaches.

Patterns that are determined, in part, by such techniques, may then be arranged according to one or more organizational methods, such as ontologies and taxonomies. These organizations may be used as feature sets to which information sets held the distributed ledgers are correlated and may be employed for evaluation of third party information sets to be correlated with event information sets held in such ledgers.

Many of the information sources, including those held in the ledgers and/or repositories bound to those ledgers, and those incorporated through third party services, may be subjected to standard probability domain techniques to establish clusters and other informing features. These may include principal component analysis (PCA), formal concept analysis, support vector machine (SVM), kernel techniques and other common machine learning approaches. The use of matrix and lattice techniques for the evaluation and expression of information sets so as to establish and manage patterns for event monitoring can also be incorporated.

Given that the information sets upon which such machine learning techniques can be applied are constrained to those events generated through a VHU or a proxy thereof, other information sources relating to those events and the context in which those events occurred, the range and type of machine learning so applied provides specific advantage in the determination of patterns that include these events are well suited to a topological approach. The use of an immutable reference time to intermediate and/or weight probability distributions supports methods for enhancing the reconciliation and in some cases establishing causal relationships. The following is an example description of a common pattern, based on the previously discussed example events, which may be identified using one of the described techniques, applied to events from the same vehicle in previous days and weeks. The vehicle occupant tends to take a similar route during weekday morning drives (from around 7:00 AM to around 9:00 AM).

```
{
    "patternId": "C7D7690D8E1F1FE0164B630A34B8323A",
    "anonymousCarId": "XY0677052M92",
    "MSA": "Los Angeles",
    "daypart": "Morning Drive",
    "dayOfWeek": "Weekdays",
    "startTime": "07:00",
    "endTime": "09:10",
    "travel":{
        "from":{
            "zipcode":91101
        },
        "to":{
            "zipcode":91773
        },
```

```
        },
        "listen":[{
          "source":"Tuner",
          "band":"FM",
          "station":"KPCC-FM"
        }]
}
```

The specific events in the above example show an exception in the common pattern: at 8:36:33 local time the radio station was changed to KVCR-FM. Contextual information shows that KPCC-FM, the NPR radio station the vehicle occupant usually listens to, started a quarterly pledge drive at 8:30. Long-term historical events from the same vehicle (or events from multiple vehicles in the same area and equivalent demographic group) may show a correlation between the station pledge drives and change in number of listeners.

In some embodiments, patterns may be created that represent what are well understood behavior patterns for users and vehicles. These may include:

Morning/evening commute;
Morning/afternoon school run;
Regular journeys (for example with common destinations such as for shopping/social/work);
Vacations;
And the like.

Each of these categories may be applied as an identifier for a pattern, as may time of day, day of week and week of year temporal segmentations. Holidays, school events and other calendar based social information sets as well as industry specific calendars may also provide identifiers for patterns and/or may comprise characteristics of another pattern identified with another category, such as being attributes of that pattern. A pattern's origin may also form part of an identification schema. For example, whether a pattern was determined by the systems operators, clients (for example as a report) or was the outcome of at least one machine learning technique. Identification of patterns may be formed into ontologies, taxonomies and other organizational arrangements.

As the systems employ a sets of ledgers, including for events, time and identity, there becomes an immutable repository of such information held by these ledgers. This may be supported by further repositories 106, of FIG. 1 and 740, 750, and 752 of FIG. 7. In this example, historical data can be held in a specific repository, e.g. learned/historical/profile data repository 752 of FIG. 7, which in general can include those sets of historical information that may be reused through the system operations. For example, a historical set of patterns pertaining to a specific time of year, large social event or other situation with a large contextual footprint may be retained and used to evaluate other similar occurrences and/or form the basis for predictions for similar events.

An event's time can be used to associate such events with events from other sources and with contextual information, such as traffic, weather, local news. This association can be done using the timeslots, expressed in some embodiments as EC's, recorded on the reference time ledger, effectively making the time association immutable and verifiable.

Sequences of events from the same vehicle can be used to identify the start and the end of a journey, for example from VHU provided (directly or indirectly) vehicle operating parameters, such as engine start, engine stop, velocity and the like. This journey may involve one or more experience for the occupant involving one or more media sources that may be determined to be experience sessions, such as listening to a radio station or making a phone call.

For example a specific sequences of events may be used to determine the start and end of a journey and may also include other engine ignition on and engine ignition off events, for example when filling a vehicle with fuel, stopping briefly at a specific destination (for example a school, shop and or the like), where these events may be integrated into a journey based, in part on the location information sets provided by a vehicle and/or other location tracking systems (such as a cellphones GPS). In some embodiments each identified journey may be stored in a repository and aligned with one or more time reference ledgers and/or identity ledgers and be configured so as to include at least one experience sessions.

Event locations, experience sessions, journeys and contextual information for one specific vehicle can be combined in order to identify common activity patterns, such as common routes, common listening or other experience behaviors, preferred methods of user interaction, etc., all under specific times and context combinations aligned to one or more time reference and/or identity ledgers.

In one exemplary example, for a particular vehicle, common journeys, including their start and end locations at specific times during week days can be identified. Using location information, the most common routes taken by the vehicle during those common journeys can be obtained, as well as common experience sessions, during those common journeys. These repeated behaviors may form the basis for detecting and determining divergence from these patterns, which in some embodiments may be correlated to experience session to identify attribution, such as that caused by single or multiple exposure to an advertisement or other promotion experienced during such a session within a journey. Such an approach can support the capability to identify variations in these common patterns and find one or more correlations between these variations and matching contextual information.

In some embodiments, data from the identified listening experiences from multiple vehicles can be parsed and transformed into demographic and geographic based metrics that are commonly utilized by the audio industry into various forms of data products including data dashboard applications 770, data access APIs 772, and report generation 774, as shown in at least FIG. 7. The data can be output as a report 774, as shown in which may include such metrics as, but not limited to: average quarter hour (AQH), AQH Rating, unique number of listeners (CUME), CUME Rating, and time spent listening (TSL). Metrics for each audio source are calculated by examining the listening experience time, duration in seconds, geography and the vehicle's unique identity.

In some embodiments, event information may be provided by an intermediate process, for example a set of VHU data may be aggregated and/or processed. This processing may include anonymization of one or more of the information parameters provided by the VHU, for example the identity of the VHU, vehicle, location and the like. Further this processing may include providing quantized stream of such information, where for example the information set is broken into discrete time segments, for example 1 minute.

In some embodiments, calculated metrics that are the result of processing matching and analytics and/or other evaluations, configurations, formatting or other processing, may be stored as aggregate information sets, using multiple aggregation criteria, such as market, demographic, media source, station, date, and the like in an appropriate repository 750. This aggregated information sets may then be used to produce reports 770, 772, 774, for data analysis and visualization dashboards or for integration with decision making support systems within industry organizations (radio networks, media streaming companies, advertisers, etc.)

Individual vehicle and/or listener identity information, including unique vehicle identification and/or driver or other occupant identification, can be recorded in an identity distributed ledger, such as a blockchain, along with various attributes and references to externally stored information for the vehicle and or listener. Attributes of a vehicle and/or listener can be stored in the identity ledger. Some of these attributes can be cryptographically signed by an attribute source, for example using a public-key cryptography. This supports third-party verification of attributes, by storing the attribute (claim) and the verification key (such a cryptographic public key) of the attribute source (claim issuer). All attribute changes and any addition of new attributes can be done as new records in the identity ledger, providing an immutable historical record of such changes.

Personal identifiable information (PII) of the vehicle and/or listener can be securely kept in digitally encrypted storage apart from the identity ledger, while the public keys are kept in the ledger. This enables a verifiable, trackable way of sharing PII with specific authorized parties while keeping PII unavailable for unauthorized ones. An access key can be created with such mechanisms as to make them revocable or valid only for a limited period of time. Revoking keys or removing external the PII storage, partially or completely, are mechanisms that support implementation of requests to "forget" an individual or his/her personal information within the system (possible implementations of "right to be forgotten" regulations in some countries).

In one example, a distributed ledger, such as a blockchain, can be understood for the purpose of this invention as any system that implements a fully-automatized distributed digital ledger that is used to record and synchronize transactions across computing devices (or nodes) connected through a computer network. Each node in the distributed ledger can have a unique identity which controls participation and access to the ledger. Agreement, based on a well-defined consensus mechanism, is required from all network members to validate and approve new transactions, and only approved transactions are recorded in the ledger. No one individual can delete or alter a transaction after they have been recorded. Such mechanism results in an immutable, distributed record of every transaction which can be used as a decentralized source of truth for the history recorded therein.

A distributed ledger can be used as a reference time ledger, as discussed above, storing timeslots along with references (unique identifier, cryptographic hash, cryptographic keys and/or a combination thereof) of events, event groups, event frameworks and/or event containers. This configuration creates a mechanism to verify time references, time alignment and time corrections for events, event groups, contextual data, as well as aggregates and other data processing outputs. For example, in FIG. 2 illustrates reference time ledgers using differing time granularities 202, 203, 204, where the event containers 210, 212, 214 match these granularities. This may be the case where a set of information has been received from a VHU proxy, such as that provided by a vehicle OEM or third party, where the timing granularity is in excess of that commonly used within the system, for example if the information sets has time granularity of a minute and the system uses timing of a second. The reference time source 201 may be used to synchronize these timings, with any offsets, and a time reference ledger may be instantiated with the granularity of the proxy information set, for example a minute, to immutably record these events. On subsequent event and correlated timing information becoming available, for example form third party sources with higher granularity, these events may be further related to other event containers and/or time reference ledgers with higher timing granularity.

Another distributed ledger can be used as an identity ledger recording identity information, attributes, providing a way to keep track of vehicles' and/or listeners' attributes. References and access keys to externally stored to personal identifiable information (PII) can also be stored in the identity ledger. The PII can be stored separately using access control mechanisms such as encryption and access controlled storage subsystems. The identity ledger 205 can share a common trusted time reference 201 with the reference time ledgers 202, 203, 204.

Figure 13:
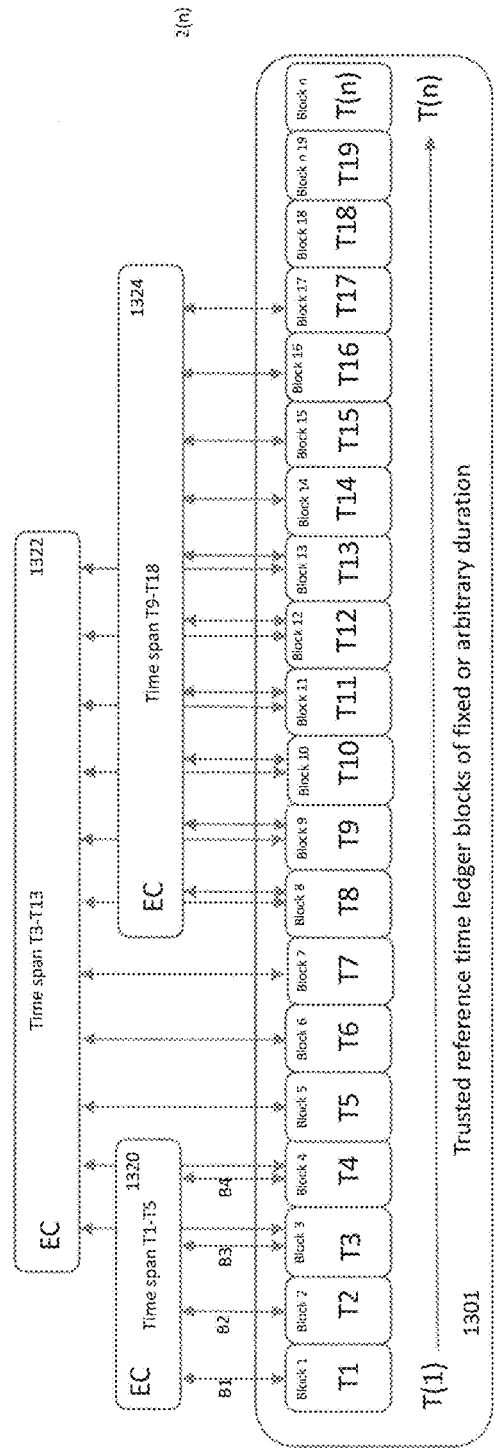
FIG. 13 shows an example of event containers bound to blocks in a time reference ledger.

In some embodiments, each block chain block may have a time period that is fixed or arbitrary in length, for example as shown in FIG. 13, a time reference ledger 1301 as illustrated by each block T1-Tn. Each of these blocks T1-Tn, can include the timing information recorded from a trusted reference time source in a trusted, authenticated and authorized manner, can be bound to one or more event containers, which have time information that includes the time information stored in the block. This binding function, as shown as B1, B2, B3, B4, may be undertaken using standard cryptographic techniques, including hash functions, public key, symmetric key and/or other applicable techniques in any arrangement known in the art. Once this binding B1-B4 has been undertaken each of the event containers bound to blocks for a certain period, as illustrated in FIG. 1320, 1322, 1324 can each have at least on event framework bound to it, using similar cryptographic binding techniques. In this manner, the event information received from a VHU or proxy with a time signature can be aligned to an immutable ledger providing a verifiable record of that event with the advantage of the information set of that event being extensible as further event information becomes available.

Figure 14:
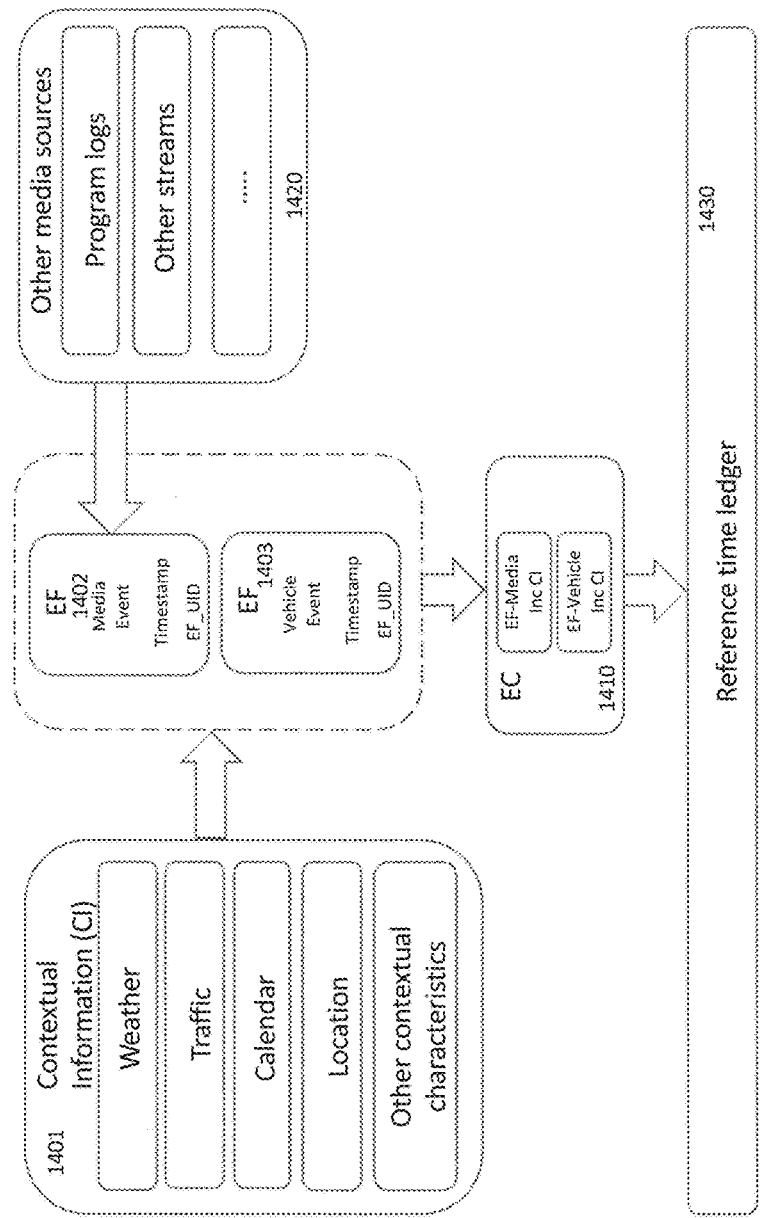
FIG. 14 shows an example of contextual and other supporting event information added to an event framework.

The collection of event information sets from a single source, such as a VHU or proxy thereof can represent only a partial perspective on the media experience for at least one occupant in a vehicle. FIG. 14 illustrates the addition of contextual information 1401 to a set of media events 1402 and vehicle events 1403, where this contextual information 1401 may be available in real time, for example a vehicle event 1403 where windscreen washers are activated provides weather information about rain, or after the event has been recorded, for example when traffic information becomes available. In this example, the media event 1402 can be extended by other media information that has been correlated to that event, for example from a radio station program log or similar media sources 1420. These event frameworks 1402, 1403 can include the contextual information are written and bound to an event container 1410 for an appropriate time period and this in turn can be bound to an immutable record, such as a reference time ledger 1430. This provides the means for an event to bound to an immutable record in a manner that is extensible and verifiable.

In some embodiments the metrics and data aggregations that result from the event data processing, matching and analytics pipeline 720, as shown in FIG. 7, may be stored in a data repository for an aggregate and integration module 750. The data then can be used to produce reports 770, 772, 774 for customers, which include summaries of metrics behaviors filtered, aggregated and organized according to parameters such as markets, media sources, demographics, time periods and time of day, which are of particular interest to specific customers and markets.

The resulting data may also be presented to customers and end users through data visualization dashboard software application on a desktop computer or mobile computing device. Such data visualization dashboard may include multiple options for slicing and dicing the data results based on markets, media sources, demographics, time periods and time of day and so on. There may be different dashboards, with focus on particular subsets of resulting data, for different customer markets. For example, there may be vehicle OEM-focused dashboards, radio industry focused dashboards, advertising industry dashboards, music industry dashboards, etc.

Additionally, the resulting data in the aggregate and integration module 750 may be combined with reference data, such as markets, sources, population and demographics, and organized in multi-dimensional structures such as a data cube, where the data may be structured into multiple dimensions, which may include time, markets, demographics, vehicle brands and model, media content source, content format, and the like, using approaches such as star schema. The resulting data organized in this matter can then be made available to customers, for example via application programming interfaces (APIs) 772, so customers can integrate it into their own analytics systems and processes for their own data research and analytics, using approaches such as OLAP, data marts, predictive analytics or machine learning. Access to the resulting data can include access control, in order to, for example, provide access only to markets licensed by customers and to provide access to PII only to parties approved by end users or government.

APIs may also be created to provide customers with controlled access to the time reference ledger and to the Identity ledger, so the resulting data and its attributes, such as its sources, time accuracy, applied methods and the like can be verified.

It should be noted that the present invention is described and shown in connection with the monitoring and analysis of cross channel consumption in a vehicle but it should be understood the present invention has applicability in any environment or location.

It would be appreciated by those skilled in the art that various changes and modifications can be made to the illustrated embodiments without departing from the spirit of the present invention. All such modifications and changes are intended to be covered by the appended claims.

What is claimed is:

1. A method for measuring and analyzing in vehicle media consumption and user interaction with a vehicle through an in vehicle entertainment system located in the vehicle, the method comprising steps of:
    receiving media content through the in vehicle entertainment system, the in vehicle entertainment system is configured as a head unit located in the vehicle, wherein the head unit further includes a computing device in the head unit with storage, a display, operation controls, a microprocessor, a memory component, I/O inputs and outputs and an operating system installed and running thereon;
    monitoring both the media content and the user interaction with the vehicle in response to the media content, with content and interaction measurement software stored in the storage of the head unit of the vehicle as a module on the in vehicle entertainment system;
    the content and interaction measurement software directly recording data relative to the media content being played and the user interaction, in real time, as a data set; and
    transmitting the data set relative to the media content being played and user interaction to at least one immutable distributed ledger;
    wherein the data set includes at least a local time of a start of the media content or the user interaction; and
    wherein the data set is hashed and bound to the at least one immutable distributed ledger.

2. The method of claim 1, further comprising
    generating a report, based on the data set, relating to the user interaction with the media content and the vehicle; and
    determining a set of consumption and use habits of at least one user from the report.

3. The method of claim 1, wherein the data set comprises at least one of: vehicle identification parameters, vehicle position parameters, vehicle operation parameters, media source identification parameters, consumption parameters, connected consumer electronic device parameters, smartphone integration parameters, unique identification parameters, in vehicle entertainment system parameters, vehicle system parameters, content parameters, contextual data parameters, and advertising parameters.

4. The method of claim 1, further comprising processing the data by analyzing a set of consumption and use habits corresponding to at least one user and analyzing a set of situational consumption and use habits corresponding to the at least one user corresponding to a set of situations.

5. The method of claim 4,
    wherein the data may be obfuscated for a purpose of privacy.

6. The method of claim 4,
    wherein the set of consumption and use habits may be determined through repeated patterns in event set data stored in the at least one immutable distributed ledger.

7. The method of claim 1, further comprises steps of:
    storing the data on the memory component of the in vehicle entertainment system; and
    periodically transmitting the data to one of the at least one immutable distributed ledger and another repositories connected to the at least one immutable distributed ledger.

8. The method of claim 7, wherein time and frequency of the step of periodically transmitting the data is configurable.

9. The method of claim 1, wherein the data set comprises an information set which is bound to a reference time and a reference location.

10. The method of claim 9, further comprising normalizing the reference time to conform to a reference time ledger to immutably bind the reference time.

11. The method of claim 9, further comprising normalizing the reference location to conform to a reference location ledger to immutably bind the reference location.

12. The method of claim 9, wherein the data set further includes at least one unique identifier.

13. A media consumption and user interaction measurement system for measuring and analyzing in vehicle media consumption and user interaction, the system comprising:
    a vehicle;
    an in vehicle entertainment system configured as a head unit in the vehicle, the head unit including a computing device with storage, a display, operation controls, a microprocessor, a memory component, I/O inputs and an operating system, the in vehicle entertainment system being operable to selectively receive media content;

content and interaction measurement software stored on the memory component of the in vehicle entertainment system as a module, the content and interaction measurement software being operable by the processor and being configured to directly record data relative to the media consumption and the user interaction, in real time, as a data set;

the module being configured and arranged for monitoring the media consumption and the user interaction with the vehicle in response to the media content, with the computing device; and an immutable distributed ledger configured and arranged to receive and store a data set from the vehicle head unit, wherein the data set includes at least a local time of a start of the media content or the user interaction, and wherein the data set is hashed and bound to the immutable distributed ledger.

14. The measurement system of claim 13, wherein the data set comprises at least one of: vehicle identification parameters, vehicle position parameters, vehicle operation parameters, media source identification parameters, consumption parameters, connected consumer electronic device parameters, smartphone integration parameters, unique identification parameters, in vehicle entertainment system parameters, vehicle system parameters, content parameters, contextual data parameters, and advertising parameters.

15. The measurement system of claim 13,
wherein the system is configured to process the data set received by at least one repository connected to the immutable distributed ledger and is configured to generate reports based on the data processed.

16. The measurement system of claim 13,
wherein the data set comprises an information set which is bound to a reference time and a reference location.

17. The measurement system of claim 16,
wherein the reference time is normalized to conform to a reference time ledger to immutably bind the reference time.

18. The measurement system of claim 16,
wherein the reference location is normalized to conform to a reference location ledger to immutably bind the reference location.

19. The measurement system of claim 16, wherein the information set further includes at least one unique identifier.

20. The measurement system of claim 13, wherein the data set is cryptographically bound to the immutable distributed ledger.

21. The measurement system of claim 13, wherein the data set is stored in a repository which is cryptographically bound to the immutable distributed ledger.

22. The measurement system of claim 13,
wherein the data set is stored in a repository which is cryptographically bound to the immutable distributed ledger, and
wherein the data set is encrypted.

23. The measurement system of claim 13,
wherein the data set is stored in a repository which is cryptographically bound to the immutable distributed ledger,
wherein the data set is encrypted, and
wherein at least one encryption key is stored in the immutable distributed ledger or a hash of the at least one encryption key is stored in the immutable distributed ledger.

24. The measurement system of claim 13, wherein user interaction includes interaction of a plurality of users with the vehicle.

25. The measurement system of claim 13,
wherein the system is configured and arranged to establish typical patterns of behavior based on the data, and
wherein the system is configured and arranged to measure an impact of an in vehicle experience on the user by comparing the typical pattern of behavior and a reaction of the user to the experience.

26. A method for measuring and analyzing in vehicle media consumption and user interaction with a vehicle through an in vehicle entertainment system located in the vehicle, the method comprising steps of:

receiving media content through the in vehicle entertainment system, the in vehicle entertainment system is configured as a head unit located in the vehicle, wherein the head unit further includes a computing device in the head unit with storage, a display, operation controls, a microprocessor, a memory component, I/O inputs and outputs and an operating system installed and running thereon;

monitoring both the media content and the user interaction with the vehicle in response to the media content, with content and interaction measurement software stored in the storage of the head unit of the vehicle as a module on the in vehicle entertainment system;

the content and interaction measurement software directly recording data relative to the media content being played and the user interaction, in real time, as an event set; and transmitting the event set relative to the media content being played and the user interaction to at least one immutable distributed ledger;

wherein the event set includes at least a local time of a start of the event set;

wherein the event set is hashed and bound to the at least one immutable distributed ledger; and wherein the hash is identified as a root of trust for the event set.

27. The method of claim 26,
wherein the event set is stored in the at least one immutable distributed ledger and a hashed representation of the event set configured as a verification of events occurring over a specific time period.

28. The method of claim 26,
wherein the event set is stored in the at least one immutable distributed ledger and a hashed representation of the event set is configured as verification of events occurring at a set of locations.

29. The method of claim 26,
wherein the event set is stored in the at least one immutable distributed ledger and hashed representation of the event set is configured to support normalization of further data sets correlated to the event set.

* * * * *